(12) United States Patent
Simmons et al.

(10) Patent No.: US 11,272,657 B2
(45) Date of Patent: *Mar. 15, 2022

(54) STRAND FEED MECHANISM FOR A STRAND TRIMMER

(71) Applicant: Trimverse LLC, Easton, KS (US)

(72) Inventors: Robert Simmons, Easton, KS (US); Mark T. Hamann, Cibolo, TX (US); Royce M. Peters, LaCoste, TX (US)

(73) Assignee: Trimverse LLC, Easton, KS (US)

( * ) Notice: Subject to any disclaimer, the term of this patent is extended or adjusted under 35 U.S.C. 154(b) by 378 days.

This patent is subject to a terminal disclaimer.

(21) Appl. No.: 16/284,667

(22) Filed: Feb. 25, 2019

(65) Prior Publication Data

US 2019/0183040 A1 Jun. 20, 2019

Related U.S. Application Data

(63) Continuation-in-part of application No. 15/495,540, filed on Apr. 24, 2017, now Pat. No. 10,548,262.

(60) Provisional application No. 62/327,013, filed on Apr. 25, 2016.

(51) Int. Cl.
*A01D 34/416* (2006.01)
*A01D 34/86* (2006.01)
*A01D 101/00* (2006.01)

(52) U.S. Cl.
CPC ..... *A01D 34/4161* (2013.01); *A01D 34/4162* (2013.01); *A01D 34/4163* (2013.01); *A01D 34/863* (2013.01); *A01D 2101/00* (2013.01)

(58) Field of Classification Search
CPC ............ A01D 2101/00; A01D 34/4161; A01D 34/4162; A01D 34/4163; A01D 34/863; A01D 34/835; A01D 34/416; A01D 34/84; A01D 34/4167; A01D 34/4166
See application file for complete search history.

(56) References Cited

U.S. PATENT DOCUMENTS 3,599,403 A 8/1971 Gantz
3,665,685 A 5/1972 Allard
(Continued)

FOREIGN PATENT DOCUMENTS

EP 1305993 B1 12/2006

*Primary Examiner* — Adam J Behrens
(74) *Attorney, Agent, or Firm* — Avek IP, LLC; Kent R. Erickson

(57) ABSTRACT

A strand trimmer and method of use thereof. The strand trimmer includes a pair of pivotable arms each having a motor, a follower wheel, and a cutter-spindle assembly disposed thereon. The arms are biased toward one another and are guided by the follower wheels to pivot around obstacles passing between the arms. The motor rotates the cutter-spindle assembly to move cutting strands extending therefrom through a cutting path with sufficient rotational velocity to cut vegetation. The cutter-spindle assembly includes a reloadable spool and a strand-feed mechanism. The strand-feed mechanism includes a solenoid actuated plunger within a shaft of the cutter-spindle assembly which operates to non-contactingly actuate the plunger to feed out a length of strand. The solenoid is non-rotatably carried on the trimmer arm while the shaft of the cutter-spindle assembly is encircled by and rotated within the solenoid.

20 Claims, 14 Drawing Sheets

(56) References Cited

U.S. PATENT DOCUMENTS

| | | | | |
|---|---|---|---|---|
| 3,928,911 A | * | 12/1975 | Pittinger, Jr. | A01D 34/4161 30/276 |
| 4,091,536 A | * | 5/1978 | Bartholomew | A01D 34/4161 30/276 |
| 4,118,864 A | | 10/1978 | Pittinger, Sr. et al. | |
| 4,131,997 A | | 1/1979 | Utter | |
| 4,134,204 A | * | 1/1979 | Perdue | A01D 34/4161 30/276 |
| 4,138,810 A | * | 2/1979 | Pittinger, Sr | A01D 34/4162 30/276 |
| 4,271,594 A | | 6/1981 | Kilmer | |
| 4,663,920 A | | 5/1987 | Skovhoj | |
| 4,667,410 A | * | 5/1987 | Weid | A01D 34/4161 30/347 |
| 4,697,405 A | | 10/1987 | DeWitt et al. | |
| 4,707,919 A | * | 11/1987 | Tsuchiya | A01G 3/06 30/276 |
| 5,060,384 A | * | 10/1991 | Everts | A01D 34/4162 30/276 |
| 5,174,100 A | * | 12/1992 | Wassenberg | A01D 34/416 56/12.1 |
| 5,396,754 A | | 3/1995 | Fraley | |
| 6,487,838 B2 | | 12/2002 | Handlin | |
| 6,684,614 B2 | | 2/2004 | Greenwell | |
| 6,860,093 B2 | | 3/2005 | Scordilis | |
| 6,862,811 B2 | | 3/2005 | Mitchell | |
| 6,959,528 B1 | | 11/2005 | Scordilis | |
| 7,017,272 B2 | * | 3/2006 | Grace | A01D 34/4163 30/275.4 |
| 7,363,754 B2 | | 4/2008 | Cartner | |
| 7,467,470 B2 | | 12/2008 | Robison | |
| 7,690,177 B2 | | 4/2010 | Spitzley | |
| 8,713,904 B1 | | 5/2014 | Goudy | |
| 8,910,458 B2 | | 12/2014 | Goudy | |
| 9,084,392 B2 | | 7/2015 | Goudy | |
| 9,253,942 B2 | | 2/2016 | Alliss et al. | |
| 9,516,807 B2 | * | 12/2016 | Alliss | A01D 34/4161 |
| 9,560,803 B2 | | 2/2017 | Kobayashi | |
| 9,924,631 B2 | * | 3/2018 | Alliss | A01D 34/4163 |
| 2004/0148784 A1 | * | 8/2004 | Grace | A01D 34/4163 30/276 |
| 2005/0091853 A1 | | 5/2005 | Mitchell | |
| 2005/0193700 A1 | | 9/2005 | Bares | |
| 2006/0005520 A1 | | 1/2006 | Weidman | |
| 2008/0282554 A1 | * | 11/2008 | Grace | A01D 34/4163 30/276 |
| 2010/0223897 A1 | | 9/2010 | Mills | |
| 2015/0135669 A1 | | 5/2015 | Hafner | |
| 2016/0345493 A1 | | 12/2016 | Ma et al. | |

* cited by examiner

STRAND FEED MECHANISM FOR A STRAND TRIMMER

CROSS-REFERENCE TO RELATED APPLICATIONS

This application is a continuation-in-part of U.S. patent application Ser. No. 15/495,540 filed Apr. 24, 2017 and claims the benefit of U.S. Provisional Patent Application No. 62/327,013, filed Apr. 25, 2016, the disclosures of each of which are hereby incorporated herein in their entirety by reference.

BACKGROUND

Cutting of vegetative growth around structures and other obstacles is a common problem faced by municipalities, home owners, and the like. Mowers are generally not well suited for cutting grass, weeds, or other growth in very close proximity to structures and other obstacles such as fence rows, guard rails, and trees. A variety of trimming devices have been developed that are maneuverable into close proximity to the structures or obstacles. These devices commonly use one or more sacrificial strands extending radially outward from a hub that is spun at high rotational speeds to enable the strands to cut through the vegetation upon impact. The strands are worn down, broken off, or otherwise shortened over time and must be replaced.

Known trimming devices provide a coil of the strand on the trimming device which can be actuated to allow additional strand to be fed out to replace the worn or lost portions of strand. The coil of strand is disposed to lie in a horizontal plane such that centrifugal forces act to feed out the strand. Available coil and feed mechanism often fail to feed out strand properly due to improper operation or jamming of the strand within the mechanism. These mechanisms are also difficult and time consuming to reload with new strand.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a strand trimmer with a strand feed mechanism.

In one embodiment, the strand trimmer includes a frame assembly formed from a cross-member with a downwardly depending leg extending from each end thereof. A trimmer arm is pivotably coupled to a distal end of each leg. The trimmer arms each include a cutter-spindle assembly, a motor for rotatably driving the cutter-spindle assembly, a follower wheel, and a bias apparatus. The cutter-spindle assembly is disposed coaxially with the follower wheel which has an outer diameter that is approximately equal to an operating radius of the strand. The bias apparatus biases the trimmer arm in pivotal movement toward the opposite trimmer arm.

The trimmer arms may be disposed on opposite sides of a guard rail or fence row and drawn along the length of the guard rail or fence to trim vegetation growing in close proximity to posts of the guard rail/fence and under the guard rail or fence. When encountering the posts, the follower wheels contact the post and pivot the respective trimmer arm away from the post to allow the post to pass between the trimmer arms. The bias apparatus then draws the trimmer arms back toward the guard rail/fence after passing the post.

The cutter-spindle assembly may include a vertically aligned shaft with a strand canister disposed at a top end and a strand head disposed at the bottom end thereof. The strand canister houses a spool on which a pair of strands are coiled. Ends of the strands extend downward through a hollow in the shaft to the strand head. The strand head includes a pair of interior channels that divert the strand from a vertical path to a radially extending horizontal path. A strand-feed plunger is disposed within the shaft and is moveable axially within the shaft by operation of a solenoid and a return spring.

In one embodiment, the strand-feed plunger includes teeth or similar features that engage the strands as they pass thereby and, when actuated by a solenoid, pushes the strand downward to feed the strand out of the strand head. The teeth are configured to engage the strands in one direction but to enable movement of the plunger relative to the strand in the opposite direction.

In another embodiment, the strand-feed plunger employs centrifugal and tension forces applied to the strands to draw the strands from the spool. The strand-feed plunger includes a prong that extends to engage slots provided in the circumference of the spool. Actuation of the plunger by energizing the solenoid disengages the prong from the slot to allow the spool to rotate and feed out a length of the strands. Upon release by the solenoid, the return spring returns the plunger and the prong into engagement with another of the slots in the spool.

In another embodiment, a spindle collar that includes a solenoid and a bearing assembly is provided on the trimmer arm and supports the cutter-spindle assembly. The bearing assembly enables rotational motion of the cutter-spindle assembly within the spindle collar and within the solenoid. The strand canister is coupled to a lower end of the cutter-spindle assembly. The strand-spool is disposed in the strand canister below the strand-feed plunger and with a rotational axis of the spool aligned parallel to the length of the plunger and parallel to the axis of rotation of the cutter-spindle assembly and the strand canister. Actuation of the plunger operates to move the spool axially within the strand canister and enables sequential feeding of strand from the spool as driven by centrifugal force applied on the strands.

In another embodiment, a strand trimmer is described that includes a spindle collar mountable to a trimmer arm, and a cutter-spindle assembly rotatably mounted to the spindle collar to be rotatable about an axis. The cutter-spindle assembly includes a shaft, a plunger, a strand canister, and a spool. The shaft is aligned coaxially with the axis and includes a bore that is aligned coaxially with the axis and extends along at least a portion of the length of the shaft. The plunger is disposed within the bore in the shaft and is moveable axially within the bore. The strand canister is coupled to the shaft and includes an interior that is in communication with the bore in the shaft. The spool is disposed in the strand canister and includes a length of a strand wound thereon, and the solenoid is disposed on the spindle collar in proximity to the plunger. The solenoid is operable to non-contactingly move the plunger axially within the bore to feed out the strand from the spool. The shaft is rotated within the solenoid while the solenoid and the spindle collar remain non-rotatably fixed.

In another embodiment, a strand trimmer is described that includes a trimmer arm with a spindle collar, a cutter-spindle assembly, a plunger, a strand canister, first and second feed rings, a spool, a solenoid, and a sequencing gear. The cutter-spindle assembly is rotatably mounted to the spindle collar to be rotatable about an axis and includes a shaft aligned coaxially with the axis. The shaft includes a bore aligned coaxially with the axis and extending along at least a portion of the length of the shaft. The plunger is disposed within the bore in the shaft and is moveable axially within the bore. The strand canister is coupled to the shaft with an interior of the strand canister being in communication with the bore in the shaft. The first feed ring is disposed in the strand canister and includes a plurality of first tabs extending radially inward toward the axis. The second feed ring is disposed in the strand canister adjacent the first feed ring and includes a plurality of second tabs extending radially inward toward the axis and rotationally offset from the first tabs. The spool is disposed in the strand canister and includes a length of a strand wound thereon. The solenoid is disposed on the spindle collar in proximity to the plunger and is operable to non-contactingly move the plunger axially in a first direction within the bore to feed out the strand from the spool when the solenoid is energized. The shaft is rotated within the solenoid while the solenoid and the spindle collar remain non-rotatably fixed to the trimmer arm. The sequencing gear is disposed on the spool and includes a plurality of radially outwardly extending teeth. The first tabs obstruct rotational motion of the teeth when the solenoid is not energized, and the second tabs obstruct rotational motion of the teeth when the solenoid is energized. The strand trimmer may also include a return spring disposed in the strand canister and configured to move the plunger axially in a second direction that is opposite the first direction when the solenoid is not energized.

In another embodiment, a method for operating a strand-feed mechanism in a strand trimmer is described. By the method a cutter-spindle assembly mounted on a trimmer arm is rotated. The cutter-spindle assembly includes a shaft having an axial bore in which a plunger is disposed and a strand canister coupled to an end of the shaft. A solenoid that is affixed to the trimmer arm and in close proximity to the cutter-spindle assembly is energized. The plunger is non-contactingly moved via a magnetic field produced by the solenoid in a first direction axially along the bore. A strand-spool disposed in the strand canister is enabled to perform a first rotation by movement of the strand-spool axially along the axis by the plunger. The first rotation is performed by rotating the strand-spool a first rotational amount relative to the strand canister to feed out a first length of a strand from the strand canister.

The cutter-spindle assembly enables reliable dispensing of the strand during operation of the strand trimmer and during rotation of the cutter-spindle assembly. The assembly also enables simple and quick reloading or replacement of the spool when the length of strands thereon is exhausted.

DESCRIPTION OF THE DRAWINGS

Illustrative embodiments are described in detail below with reference to the attached drawing figures, and wherein.

DETAILED DESCRIPTION

Figure 1:
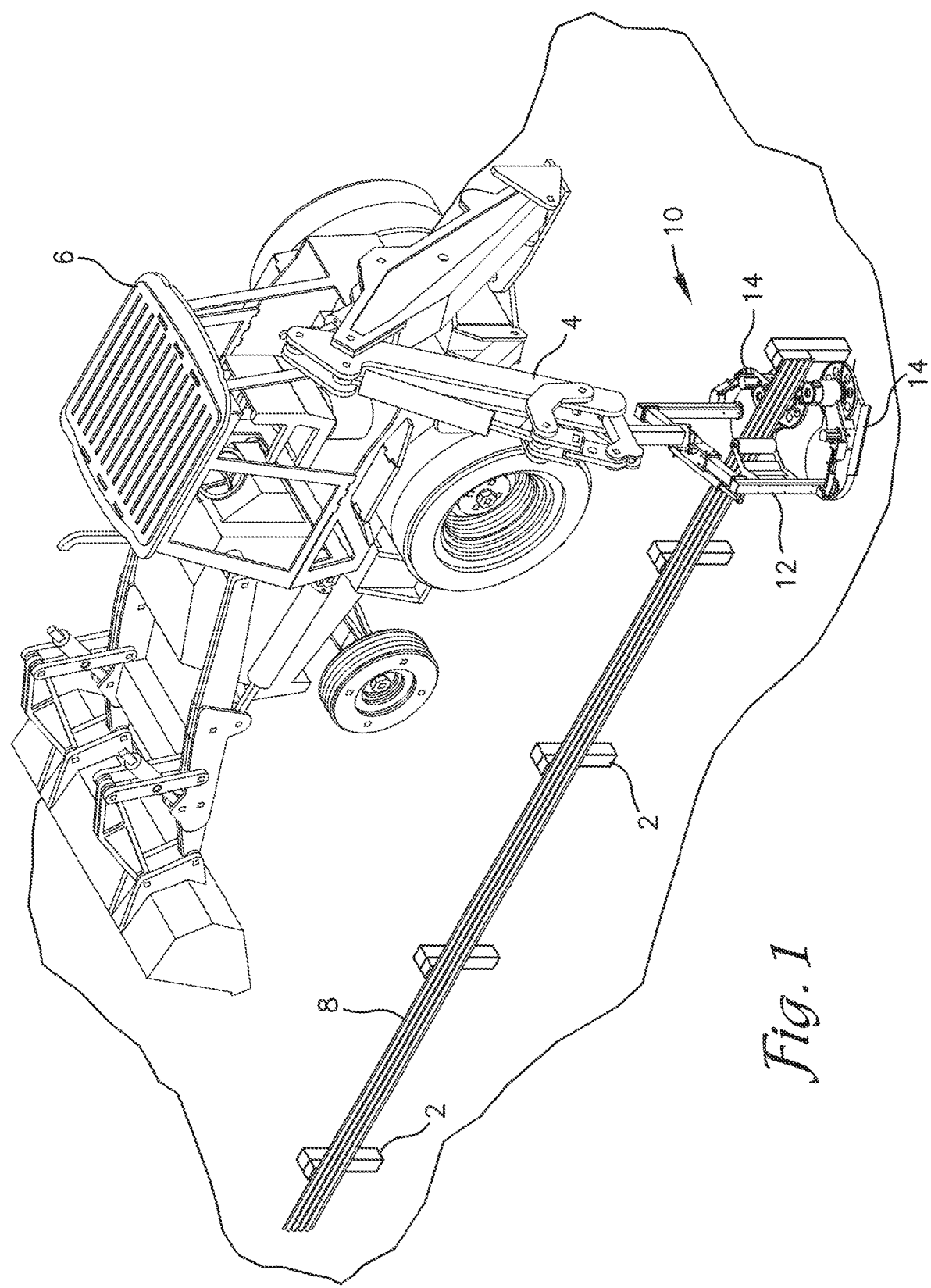
FIG. 1 is perspective view of a strand trimmer engaged around a guard rail and attached to the boom of a tractor depicted in accordance with an exemplary embodiment.

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

With reference now to FIGS. 1-6, a strand trimmer 10 is described in accordance with an exemplary embodiment. The strand trimmer 10 is described herein with respect to applications in which the strand trimmer 10 is coupled to a boom 4 of a backhoe 6 or similar tractor and for trimming vegetation around a guard rail 8, however embodiments are not so limited. Embodiments of the strand trimmer 10 can be coupled to a variety of other tractors, vehicles, carriages, or the like and can be employed for trimming vegetation around fences, trees, shrubs, edging, or the like.

The strand trimmer 10 comprises a frame 12 and a pair of trimmer arms 14 pivotably coupled thereto. The frame 12 comprises a cross-member 16 and a pair of legs 18 extending from each end thereof. In an operational orientation, the cross-member 16 is disposed to extend generally horizontally with the legs 18 extending generally vertically downward toward a ground surface. However, it is foreseen that the strand trimmer 10 might be employed in other orientations to trim vegetation or foliage growing alongside a roadway or partially overhead.

The cross-member 16 is disposed to extend through a mounting sleeve 20 and to be slideably moveable within the sleeve 20. An actuator 22 is coupled between the sleeve 20 and the cross-member 16 to move the cross-member 16 relative to the sleeve 20. The actuator 22 and additional actuators described subsequently herein are preferably hydraulic actuators but other forms of actuators or extensible means may be employed in exemplary embodiments without departing from the scope described herein. The cross-member 16 is thus moveable within the sleeve 20 to move the strand trimmer 10 side-to-side.

A boom-mount 24 is rotatably coupled to the mounting sleeve 20 via one or more bearings, ball joints, or the like. The boom-mount 24 comprises a plate or similar structure adapted to couple to a distal end of the boom 4 of the tractor 6. A coupler (not shown) such as a proprietary coupler for a particular tractor 6 might also be coupled to the boom-mount 24 to aid use with the particular tractor 6. An actuator 28 is coupled between the sleeve 20 and the boom-mount 24. The actuator 28 is thus extensible to at least partially rotate the strand trimmer 10 relative to the boom-mount 24.

Each of the legs 18 is rigidly mounted at a respective end of the cross-member 16. The trimmer arms 14 are pivotably or rotatably coupled to the distal ends of the legs 18 to enable at least partial rotation thereof in a plane perpendicular to the length of the legs 18 and generally parallel to the ground surface. At least one of the legs 18 may include a roller guide 30 disposed along the length thereof and extending generally toward to opposite leg 18. The roller guide 30 includes a roller 32, wheel, guide, or similar component positioned to contact a surface of the guard rail 8 or other feature being trimmed around and to guide movement of the strand trimmer 10 along the guard rail 8. The roller guide 30 can aid to maintain the strand trimmer 10 centered over the guard rail 8 during operation. A sensor or switch (not shown) may be associated with the roller guide 30 to sense whether the roller guide 30 is in contact with the guard rail 8 and to control operation of the actuator 28 to move the frame 12 and maintain the strand trimmer 10 centered over the guard rail 8 during operation.

The trimmer arms 14 each include a body 34, a motor 36, a follower wheel 38, and a cutter-spindle assembly 40. The body 34 includes a generally planar top surface with a downwardly extending guard flange 42 extending at least partially around the perimeter thereof. The guard flange 42 is preferably configured and positioned to obstruct the path of debris, such as cut vegetation, rocks, and other items thrown during the trimming operation to lessen the risk of such items striking persons or objects near the strand trimmer 10.

Figure 2:
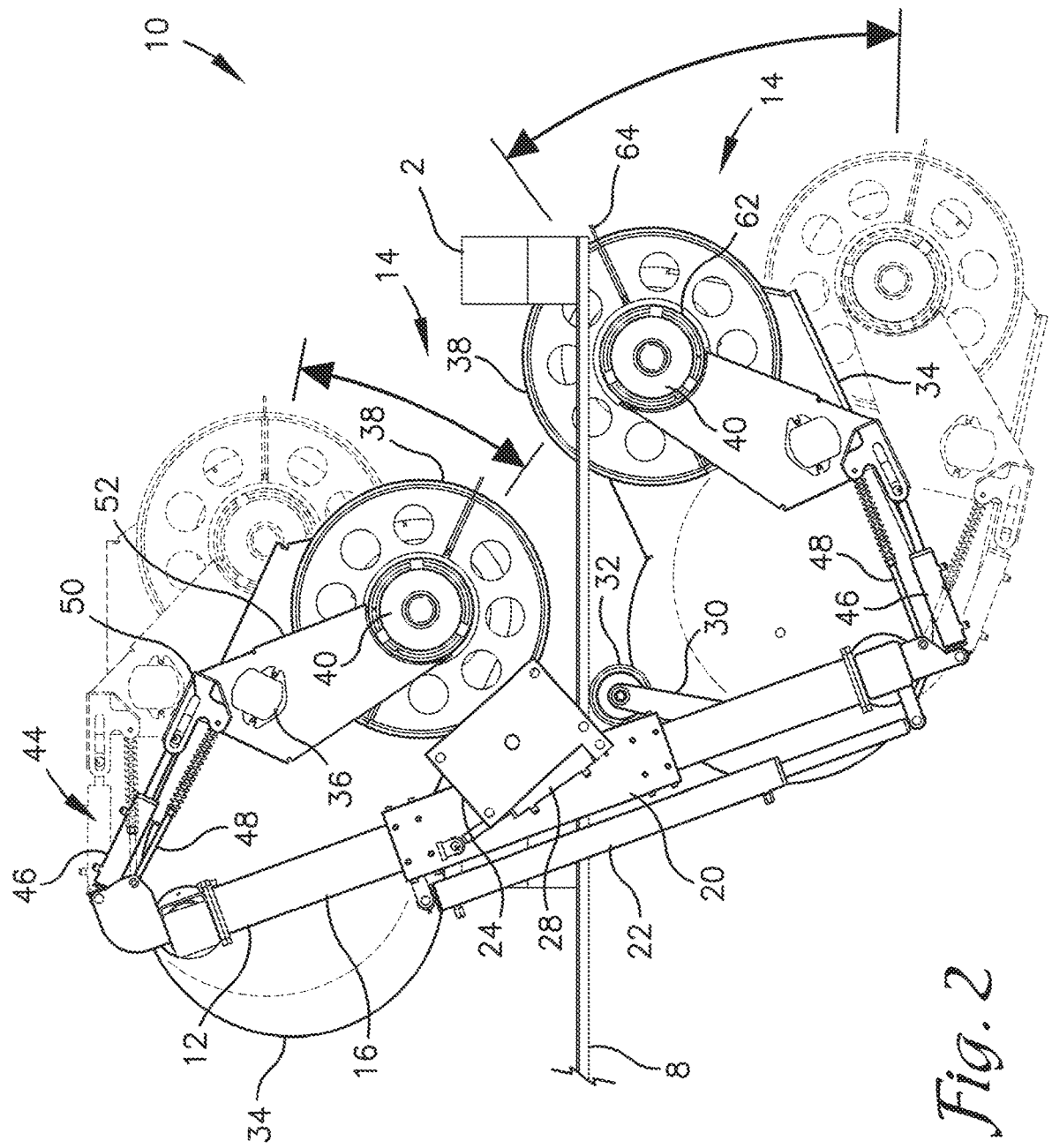
FIG. 2 is a top plan view of the strand trimmer of FIG. 1 depicting pivotal movement of trimmer arms.
Figure 3:
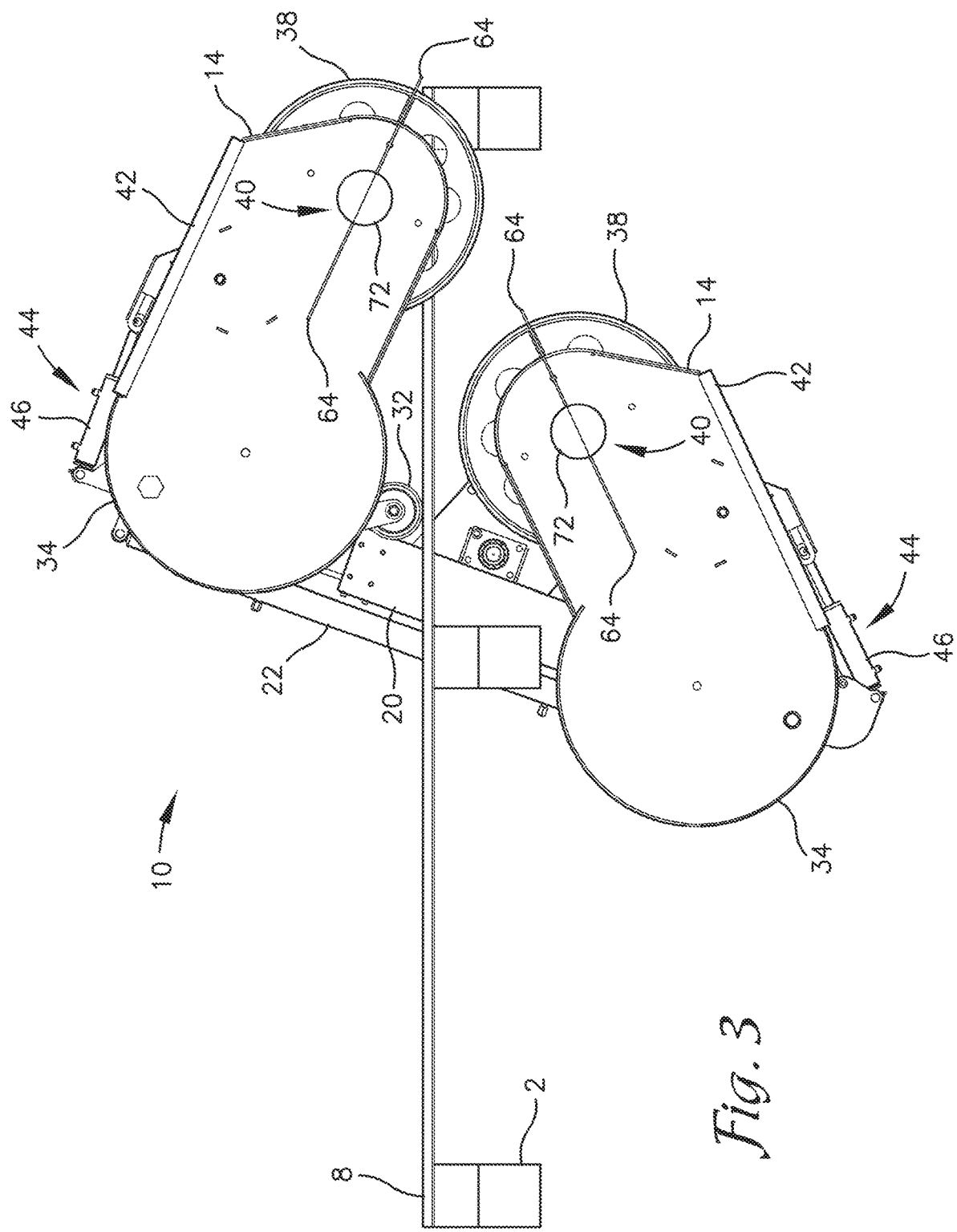
FIG. 3 is a bottom plan view of the strand trimmer of FIG. 1.
Figure 4:
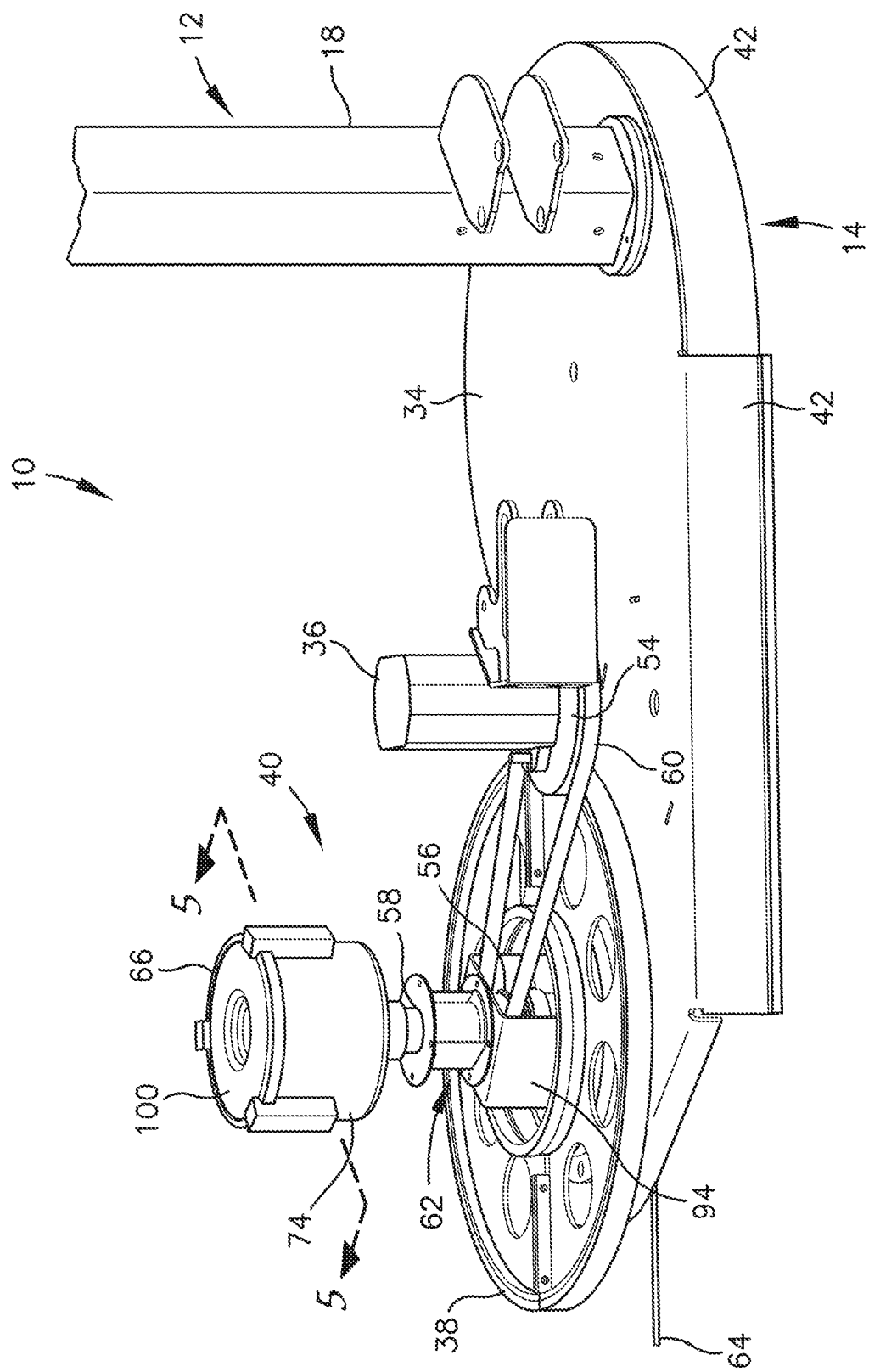
FIG. 4 is a side perspective view of a trimmer arm of the strand trimmer of FIG. 1 with portions removed to show internal components depicted in accordance with an exemplary embodiment.
Figure 5:
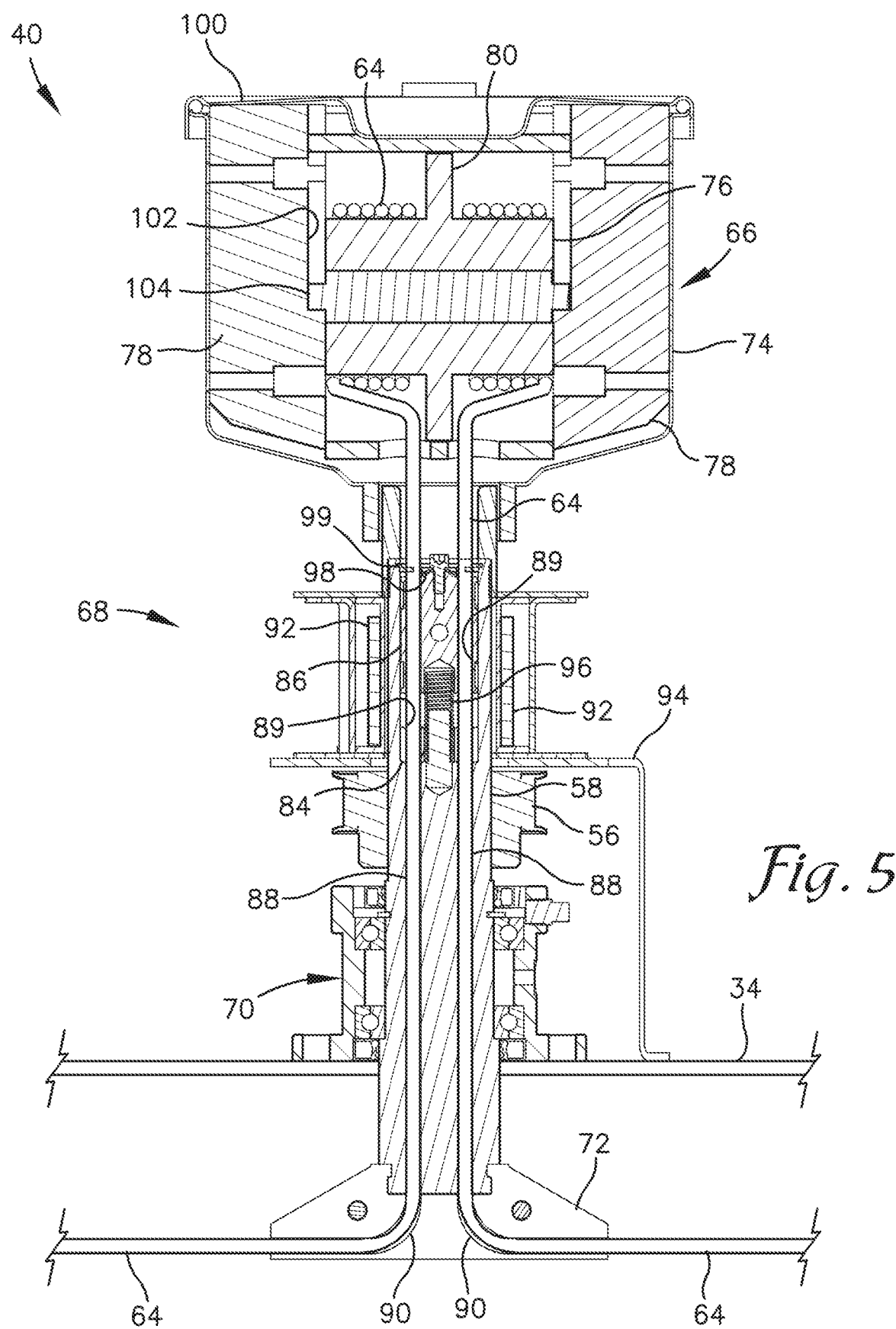
FIG. 5 is a cross-sectional view of a cutter-spindle assembly for the strand trimmer of FIG. 1 depicted in accordance with an exemplary embodiment and taken along line 5-5 of FIG. 4.
Figure 6:
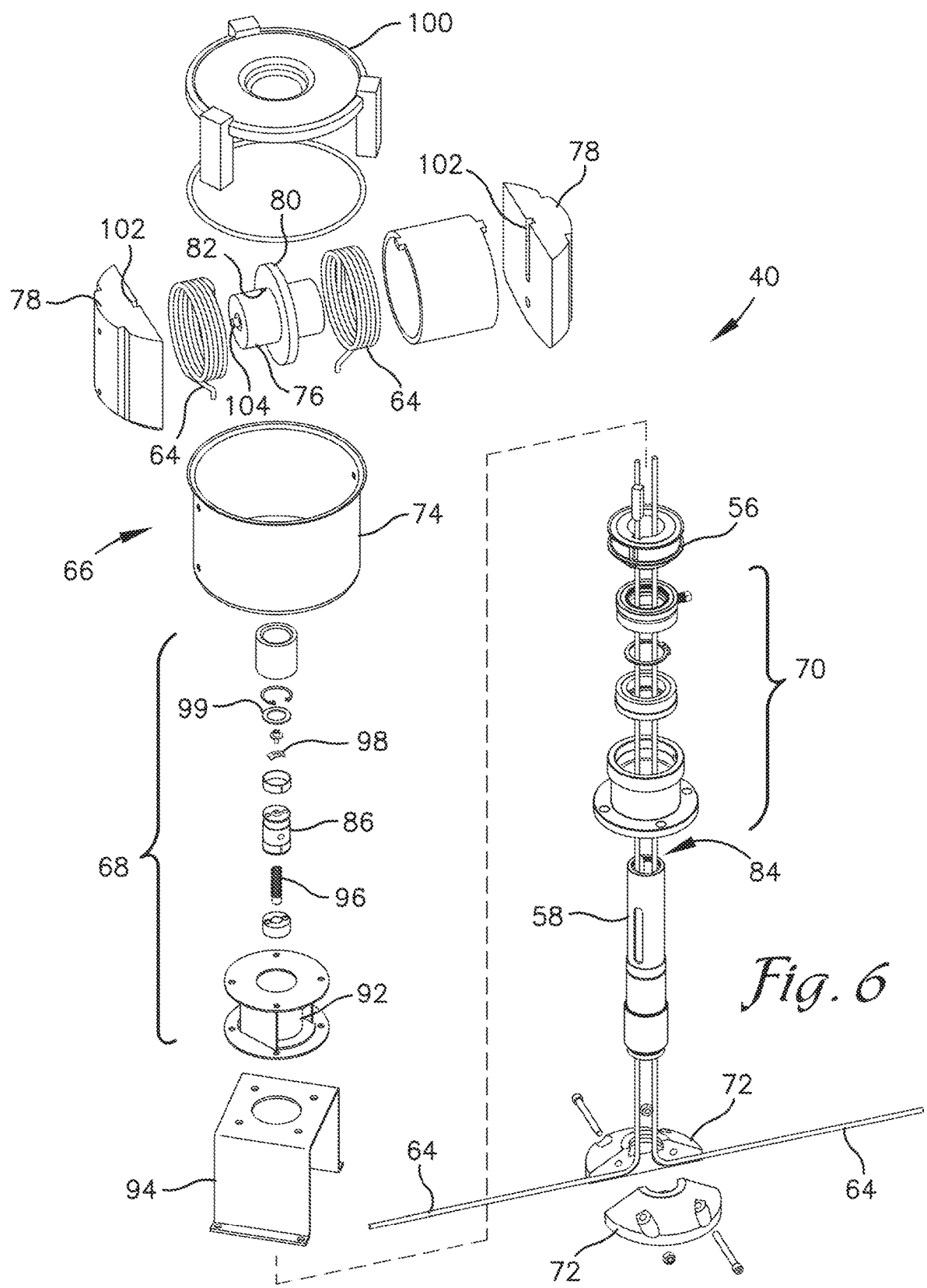
FIG. 6 is an exploded view of the cutter-spindle assembly of FIG. 5.

A biasing mechanism 44 is coupled between the leg 18 and the body 34 and is configured to bias the body 34 in pivotal movement toward the opposite trimmer arm 14. As depicted in FIGS. 1, 2, and 4, the biasing mechanism 44 comprises an actuator 46 and a spring-biased, telescoping rod 48 arranged in a parallelogram configuration. However, the biasing mechanism 44 can comprise other components and configurations in other embodiments without departing from the scope described herein.

One or both of the actuator 46 and the rod 48 may apply a biasing force on the trimmer arm 14 toward pivotal movement. In one embodiment, the actuator 46 is operated to move the trimmer arm 14 against the biasing force of the rod 48 to pivot the trimmer arms 14 away from one another, such as when initially engaging or disengaging the guard rail 8. The actuator 46 may then be placed in a floating mode to enable the rod 48 to pivot the trimmer arm 14. Or the actuator 46 may couple to the body 34 via a slotted aperture 50 within which the coupling of the actuator 46 may freely move to allow pivotal movement of the trimmer arm 14 during trimming without actuation of the actuator 46.

The body 34 may also include a mounting bracket 52 or guard on which the motor 36 may be mounted above the top surface of the body 34. The motor 36 preferably comprises a hydraulic motor configured to drive the cutter-spindle assembly 40 in rotational motion, but other forms of motor can be employed including, for example, electric, mechanical, or pneumatic motors, among others. As depicted in FIG. 4, the motor 36 is spaced above the top surface of the body 34 to provide alignment between a drive pulley 54 disposed on the motor shaft and a spindle-pulley 56 on the cutter-spindle assembly 40. The spindle-pulley 56 may comprise a pulley or similar component coupled to a shaft 58 or an annular groove formed integral with the shaft 58 of the cutter-spindle assembly 40. The drive pulley 54 and the spindle-pulley 56 are drivingly coupled via a belt 60, chain, or similar component and can be configured with a desired gear ratio sufficient to provide a desired rotational speed to the cutter-spindle assembly 40.

A spindle collar 62 is disposed at or near a distal end of the trimmer arm 14. The spindle collar 62 comprises an annular wall extending vertically upward from the top surface of the body 34 and having a diameter sufficient to receive the cutter-spindle assembly 40 axially therein. The follower wheel 38 is rotatably coupled to the exterior surface of the spindle collar 62, such as via one or more bearings. The follower wheel 38 lies in a substantially horizontal plane and has a radial dimension that is just smaller than that of a path of a strand 64 extending from the cutter-spindle assembly 40. However, the strand 64 and/or the follower wheel 38 can be dimensioned such that the strand path extends a substantially equal distance to the follower wheel 38 or a shorter distance than the follower wheel 38. As such, contact between the strand 64 and an obstacle can be allowed or eliminated as desired.

The cutter-spindle assembly 40 is rotatably disposed within the spindle collar 62. The cutter-spindle assembly 40 includes the shaft 58 with the spindle-pulley 56 disposed along the length thereof, a strand canister 66 coupled to a top end of the shaft 58, a strand-feed mechanism 68, a bearing assembly 70, and a strand head 72 disposed at a bottom end of the shaft 58. The cutter-spindle assembly 40 is vertically or axially supported within the spindle collar 62 by the bearing assembly 70.

The bearing assembly 70 comprises an available bearing assembly and is coupled between the top surface of the body 34 and the shaft 58 to enable relative rotational motion therebetween. In another embodiment, the collar 62 may engage the cutter-spindle assembly 40 to vertically support the assembly 40 but also to allow rotational motion of the assembly 40 within and relative to the collar 62. For example, the bearing assembly 70 might be disposed between the spindle collar 62 and the cutter-spindle assembly 40.

The strand canister 66 comprises a generally cylindrical housing 74 and a strand-spool 76 disposed therein to be rotatable about a generally horizontal axis. The strand canister 66 is rigidly coupled to the shaft 58 and rotates therewith about a generally vertically aligned axis extending along the length of the shaft 58 during operation of the strand trimmer 10. A pair of spacers 78 are disposed within the housing 74 to support the spool 76 generally along a diameter of the housing 74. The spool 76 includes an annular spline 80 disposed centrally along the thickness or circumference thereof that divides the circumferential surface of the spool 76 into two sections. A separate segment of the strand 64 is coiled or wrapped around each of the two sections. A bore 82 may be provided in the circumferential face of each section into which first ends of the sections of strand 64 can be inserted to anchor the strands 64 to the spool 76 to aid coiling of the strands 64 therearound. Opposite second ends of the strands 64 extend through an opening 83 in a bottom wall of the housing 74 and into a plunger-bore 84 in the shaft 58.

The plunger-bore 84 extends a distance into and coaxially with the shaft 58 and provides a space within the shaft 58 in which a piston, core, or plunger 86 of the strand-feed mechanism 68 (described below) is disposed. A pair of strand-passages 88 extend from an end surface of the plunger-bore 84 to the distal end of the shaft 58 to communicate the strands 64 to the strand head 72. The plunger 86 includes longitudinal apertures 89 extending therethrough and in alignment with the strand-passages 88 such that the strands 64 can be easily fed or guided into the strand-passages 88. The strand head 72 couples to the distal or bottom end of the shaft 58 and includes a pair of interior passages 90 that are aligned at a first end with the strand-passages 88 of the shaft 58 to receive the strands 64 therefrom. The interior passages 90 turn approximately ninety degrees to direct the strands 64 generally horizontally or radially outward from the strand head 72. In another embodiment, the strand head 72 may be formed integrally with the shaft 58.

The strand-feed mechanism 68 is disposed along the length of the shaft 58 and in radial alignment with the plunger-bore 84. The strand-feed mechanism 68 comprises the plunger 86 disposed within the plunger-bore 84 and a solenoid 92 disposed exterior to the shaft 58. The solenoid 92 may encircle the shaft 58 or may be disposed along a side thereof. The solenoid 92 comprises an electromagnetic device configured to produce a magnetic field that is operable to move the plunger 86 within the plunger-bore 84 or may comprise another mechanical and/or magnetic means operable to move the plunger 86. For example, a mechanical linkage might be provided and configured to move a permanent magnet toward and away from the shaft to bring the magnet into sufficient proximity to the plunger 86 to cause movement thereof.

A support bracket 94 is provided to fixedly support the solenoid 92; the solenoid 92 does not rotate with the shaft 58. The support bracket 94 has a generally inverted U-shaped form and is coupled to the top surface of the body 34 interior to the spindle collar 62. The shaft 58 passes through an aperture in an apex portion of the support bracket 94 which may be sized to avoid contact with the shaft 58 or may include a bearing surface or one or more bearings to rotationally support the shaft 58 within the aperture. The apex portion of the support bracket 94 is preferably configured to lie between the spindle-pulley 56 and the strand-feed mechanism 68 along the length of the shaft 58. The support bracket 94 is also configured to avoid interference with the belt 60 which engages the spindle-pulley 56.

The strand-feed mechanism 68 is configured to move the plunger 86 translationally along the axis of the shaft 58 and within the plunger-bore 84 to draw the strands 64 from the spool 76 and push the strands 64 toward and out of the strand head 72. The solenoid 92, when electrically energized magnetically draws or pushes the plunger 86 toward the strand head 72. When the solenoid 92 is de-energized, a spring 96 coupled between the plunger 86 and the shaft 58 pushes the plunger 86 toward the strand canister 66 to resume an initial position. It is understood, that the operation of the solenoid 92 and spring 96 can be reversed without departing from the scope of embodiments described herein.

The plunger 86 includes a plurality of teeth 98 that extend radially outward therefrom and at a downwardly inclined angle. The teeth 98 engage the strands 64 when the plunger 86 is moved toward the strand head 72 such that the strands 64 are moved toward the strand head 72 along with the plunger 86. When moved in the opposite direction, the teeth 98 of the plunger 86 release and slide along the surface of the strands 64 thus allowing the plunger 86 to move relative to the strands 64 and toward the strand canister 66. By this operation, the strands 64 can be incrementally fed out of the strand head 72 as desired. The feeding of the strands 64 is produced by a positive and controlled operation of the strand-feed mechanism 68 and does not rely on centrifugal forces applied by rotation of the cutter-spindle assembly 40 and does not require the trimming operation to be halted to allow additional strand 64 to be fed out; the strand 64 can be fed out on-the-fly.

A catch 99 may be provided in the plunger-bore 84 vertically above the plunger 86 and above the maximum vertical position thereof. The catch 99 is configured to enable movement of the strands 64 toward the strand head 72 when pushed/pulled by actuation of the plunger 86, but to prevent movement of the strands 64 in an opposite direction toward the strand canister 66 when the plunger 86 moves to return to its initial position. The catch 99 may include one or more teeth or downwardly angled flanges like the teeth 98 of the plunger 86 or may include one or more frictional elements that provide a frictional engagement with the strands 64 sufficient to resist movement of the strands 64 toward the strand canister 66 when the plunger 86 slides along the strands 64 but that does not substantially impede the plunger 86 from drawing the strands 64 through the catch 99 when feeding out additional lengths of the strands 64.

Figure 8:
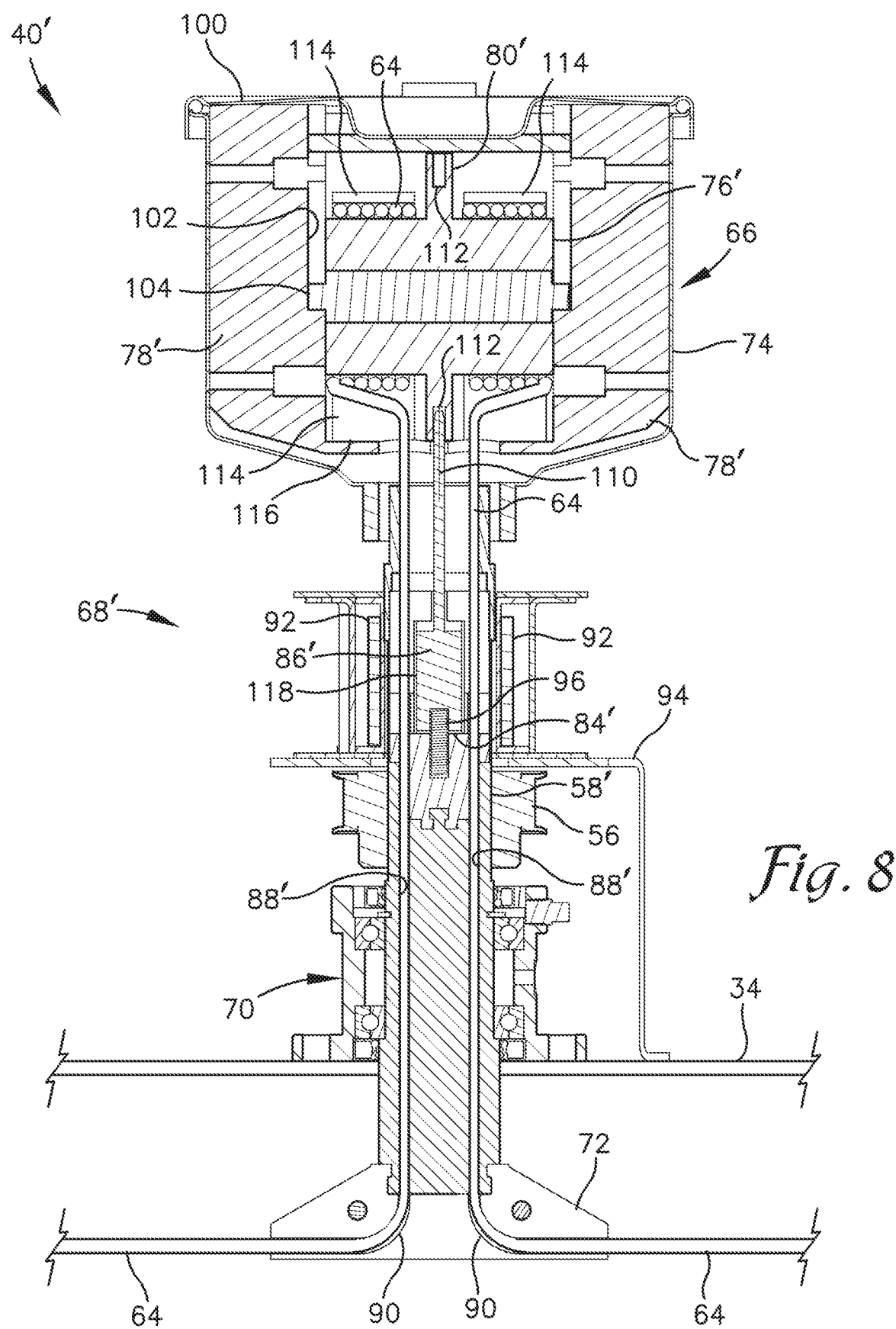
FIG. 8 is a cross-sectional view of another cutter-spindle assembly for the strand trimmer of FIG. 1 depicted in accordance with an exemplary embodiment and taken along line 5-5 of FIG. 4.
Figure 9:
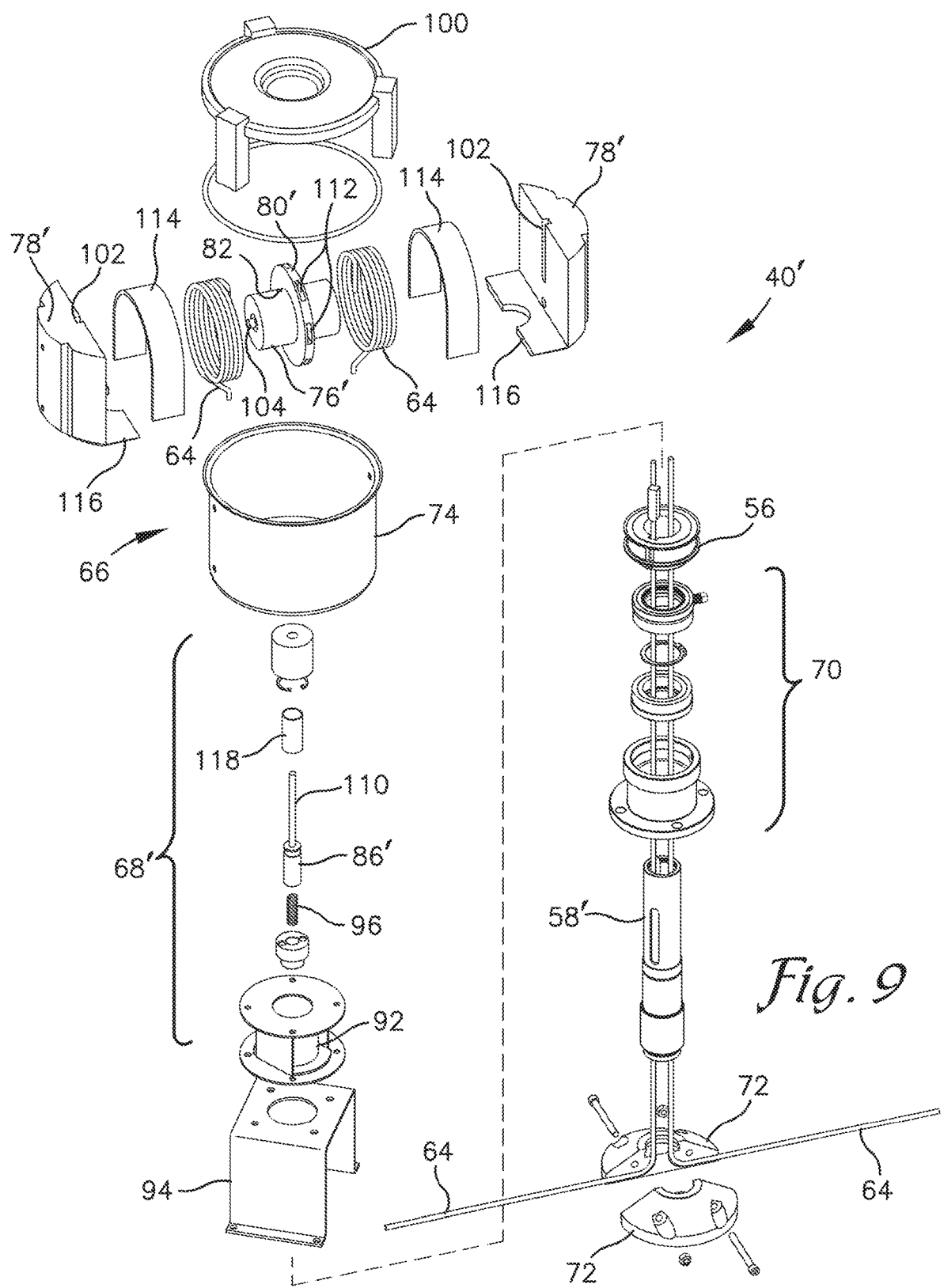
FIG. 9 is an exploded view of the cutter-spindle assembly of FIG. 8.
Figure 10:
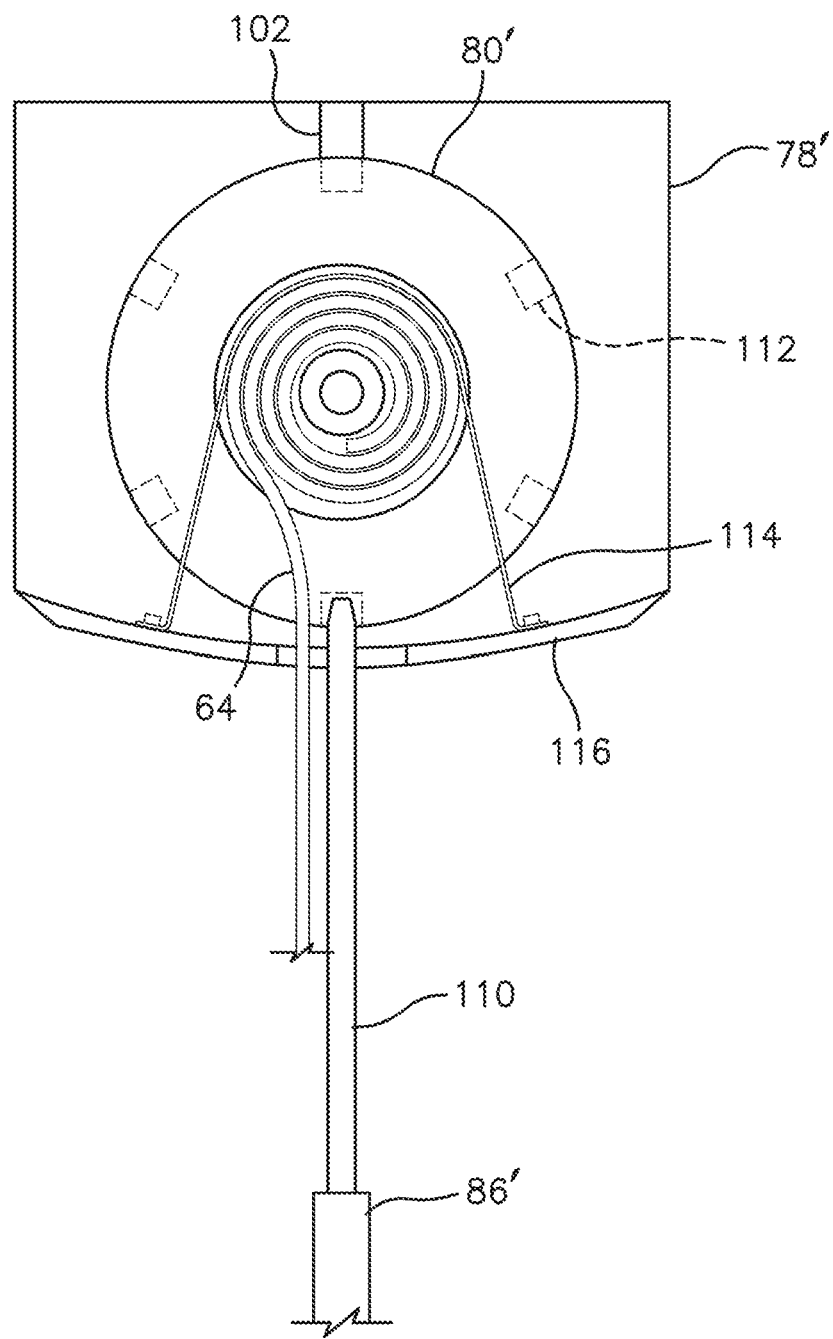
FIG. 10 is a partial side elevational view of a spool engaged by a prong on a plunger depicted in accordance with an exemplary embodiment.
Figure 11:
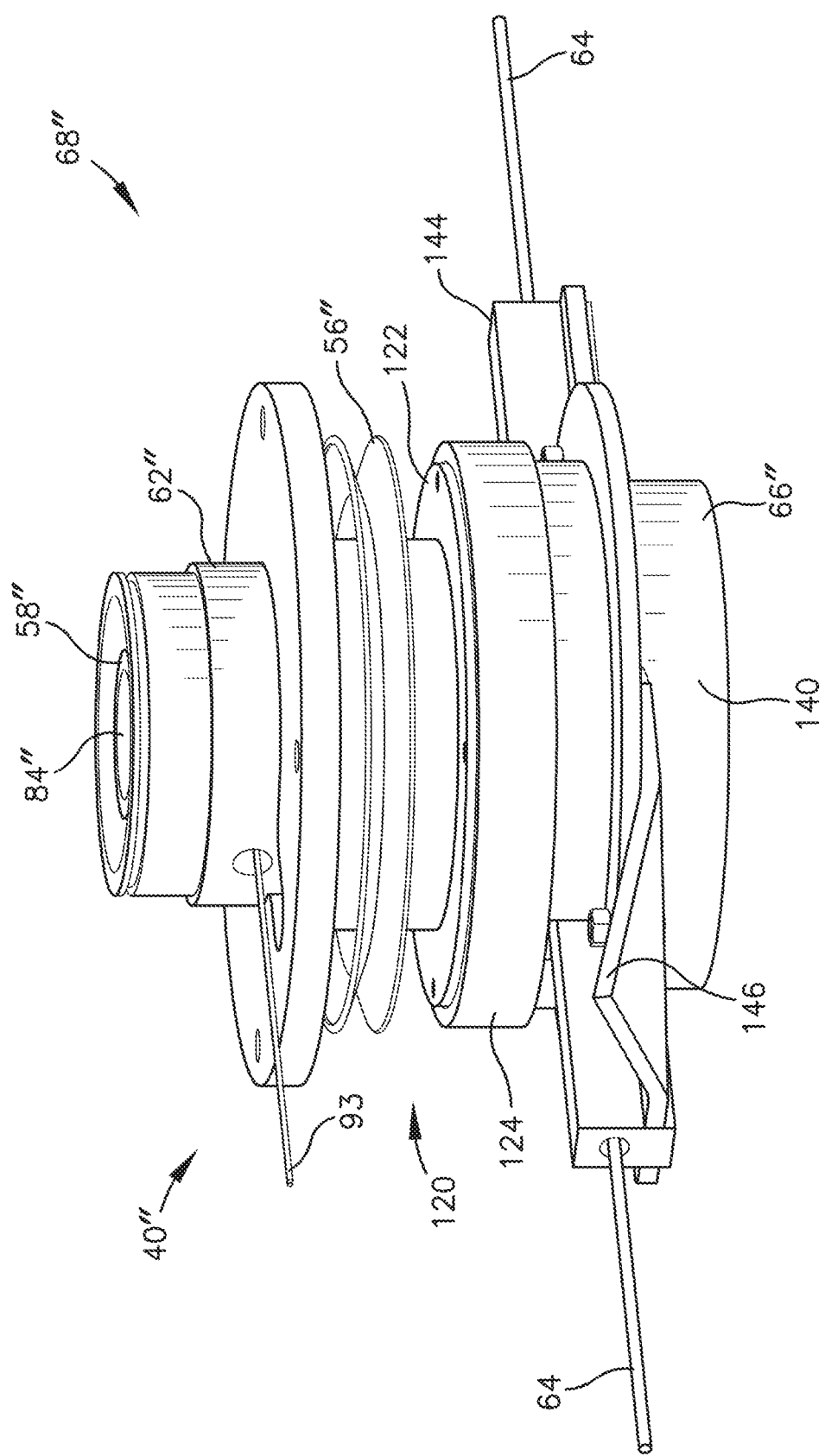
FIG. 11 is perspective view of a cutter-spindle assembly depicted in accordance with another exemplary embodiment.
Figure 12:
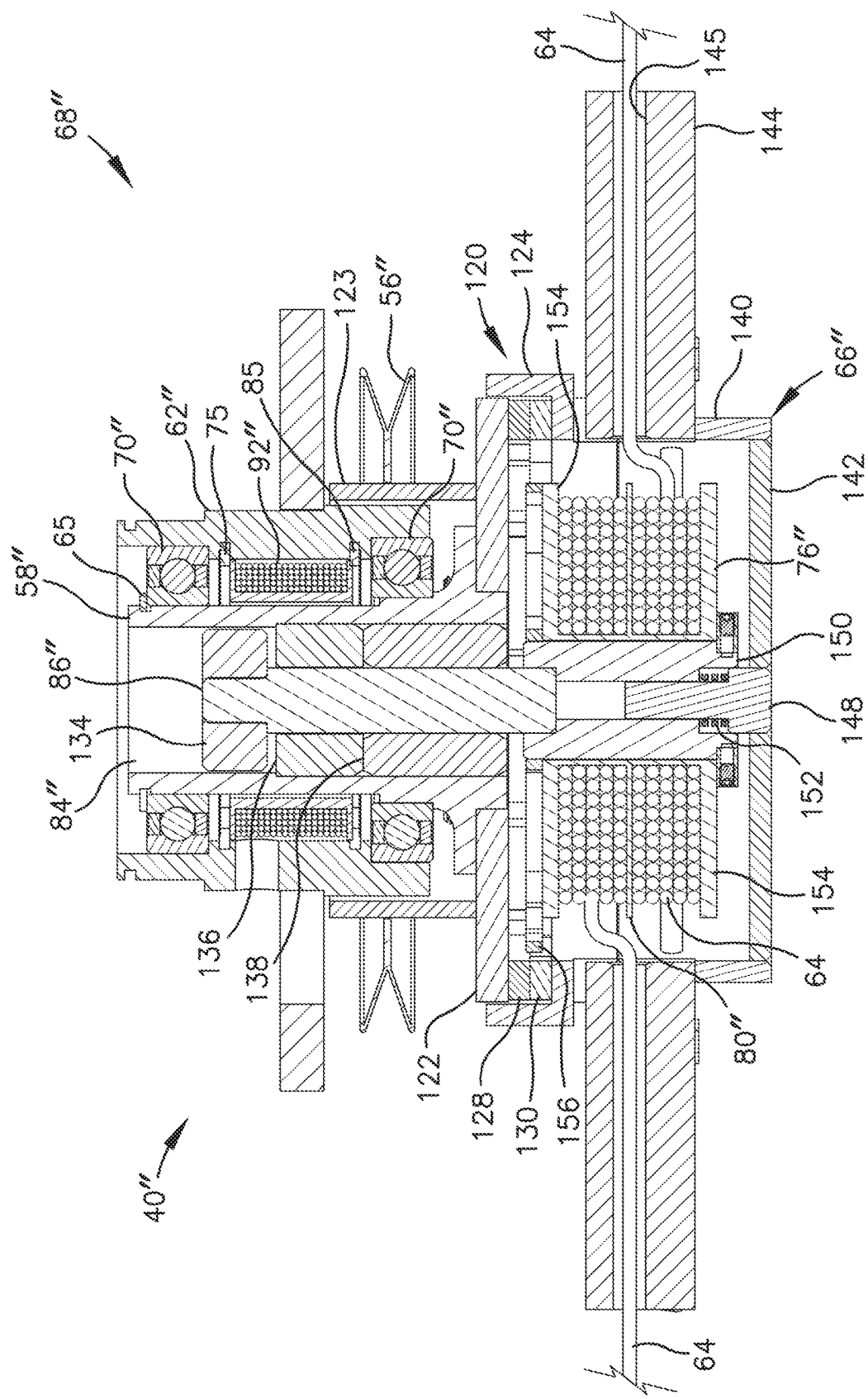
FIG. 12 is an elevational cross-sectional view of the cutter-spindle assembly of FIG. 11.
Figure 13:
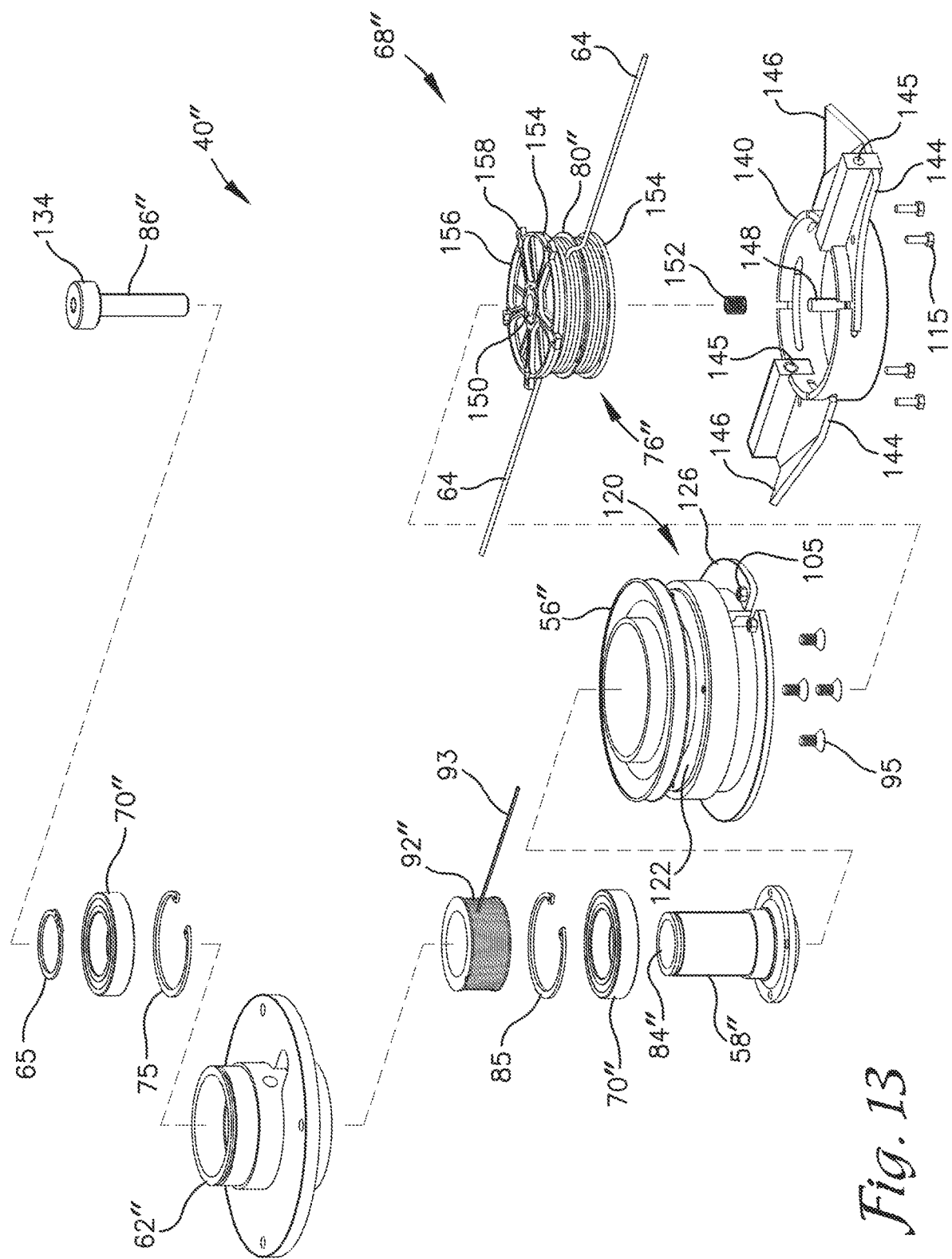
FIG. 13 is an exploded view of the cutter-spindle assembly of FIG. 11.
Figure 14:
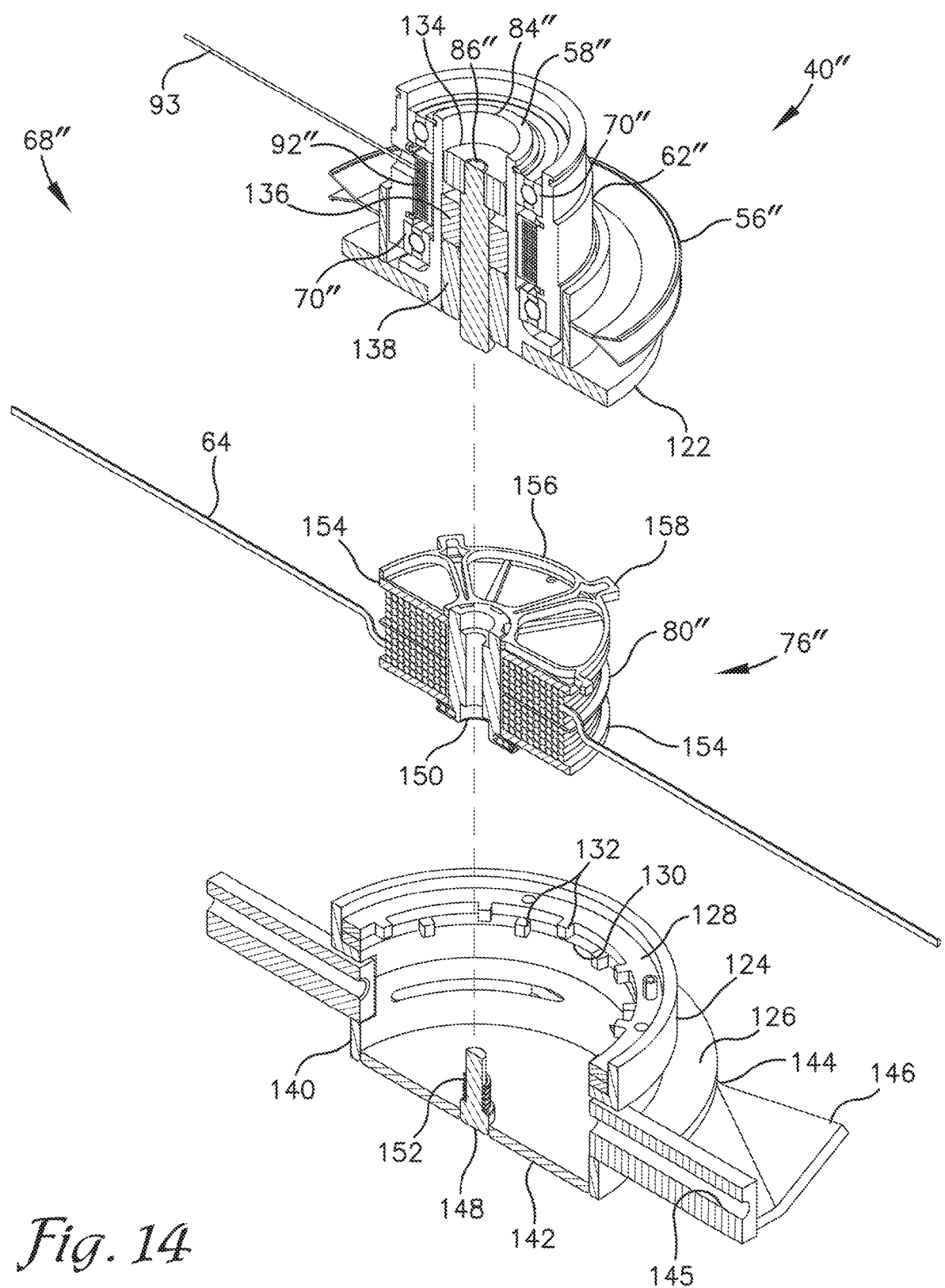
FIG. 14 is a partially exploded cross-sectional view of the cutter-spindle assembly of FIG. 11.

In another embodiment depicted in FIGS. 8-10, another strand-feed mechanism 68' is described in accordance with another exemplary embodiment. The strand-feed mechanism 68' is configured similarly to the strand-feed mechanism 68 and includes many similar features and components including a plunger 86' and solenoid 92 combination that are operable to move the plunger 86' axially along and within the plunger-bore 84' in the shaft 58'. The plunger 86', however, does not include the teeth 98 of the plunger 86 for engaging the strands 64. The plunger 86' is provided with a plunger-bore 84' that separates the plunger 86' from the strands 64. The plunger-bore 84' comprises a blind bore that extends coaxially into an end of the shaft 58'. The plunger-bore 84' may have a diameter that is larger than that of the plunger 86'. A sleeve comprised of a plastic, brass, or other non-magnetic material may be installed in the plunger-bore 84' between the plunger 86' and a sidewall of the plunger-bore 84 to aid operational movements of the plunger 86' caused by the solenoid 92 and/or to provide a low friction contact surface for the plunger 86'.

Strand-passages 88' are provided alongside but separated from the plunger-bore 84' and extend substantially through the length of the shaft 58'. The strands 64 are allowed to freely pass through the strand-passages 88'. The plunger 86' is configured to engage the spool 76' to selectively prevent rotation of the spool 76' about its axle 104. In one embodiment, the plunger 86' includes a prong 110 or other protuberance extending from an upper end thereof toward the spool 76' a sufficient distance to engage recesses, slots 112 or similar features formed in the spline 80' of the spool 76'. In another embodiment, the plunger 86' engages the spool 76' or the spline 80' directly, e.g. the plunger 86' does not include the prong 110. A plurality of the slots 112 are spaced about the perimeter of the spline 80' and are sized to receive a distal end of the prong 110 therein. In another embodiment, a plurality of tabs or other protuberances (not shown) extending radially outward from the spline 80' might be employed in place of the slots 112, such that rotation of the spool 76' is resisted by obstruction of movement of the tabs by the prong 110.

During operation of the strand trimmer 10, centrifugal force imparted on the distal ends of the strands 64 applies a tension force on the strands 64 between the distal ends and the spool 76'. The tension force operates to urge the spool 76' into rotation about its axle 104 to feed out additional lengths of the strands 64. In a normal state, the plunger 86' is biased upward toward the spool 76' by the spring 96 and the prong 110 on the plunger 86' is engaged in one of the plurality of slots 112 in the spool 76'. The spool 76' is thereby prevented from rotating about the axle 104 by engagement between the prong 110 and the slot 112. Actuation of the strand-feed mechanism 68' energizes the solenoid 92 to momentarily draw the plunger 86' downward and away from the spool 76'. In one embodiment, the plunger 86' is drawn downward for less than one second or only for a few milliseconds. The prong 110 is thus removed from the slot 112 in the spool 76' and the spool 76' is allowed to rotate about its axle 104. The tension force on the strands 64 causes the spool 76' to rotate and feed out an additional length of the strands 64. The solenoid 92 is de-energized and the spring 96 moves the plunger 86' upward toward the spool 76' to engage the prong 110 with another of the slots 112 in the spline 80' of the spool 76'. The timing or duration of the energizing of the solenoid 92 can be configured to cause the prong 110 to engage the next or adjacent slot 112 in the spline 80' or to engage any subsequent slot 112. The spacing of the slots 112 along the spline 80' may generally correspond to increments of length of the strands 64 to be fed from the trimmer head 72.

One or more straps 114 may be installed over the spool 76' to slow the rotation thereof about the axle 104 when the prong 110 is disengaged from the slots 112. A strap 114 may be disposed to overlie the coiled strand 64 on either or both sides of the spline 80' or over the spline 80' itself. The straps 114 are coupled to a component within the strand-feed mechanism 68' that does not rotate with the spool 76' as the spool 76' feeds out the strands 64. As depicted in FIGS. 8-10, the straps 114 are coupled to flanges 116 extending from the spacers 78' disposed at either end of the axle 104 of the spool 76'. The straps 114 frictionally engage the spool 76' to at least partially resist rotational movements thereof. The straps 114 are preferably formed from a rubber or similar material that provides a desired frictional engagement with the spool 76'. The straps 114 may be extensible and/or have an adjustable length to allow a tension in the straps 114 to be tailored to increase or decrease the frictional engagement with the spool 76'. In another embodiment, a bearing or similar component is coupled to or integrated with the axle 104 of the spool 76' to provide resistance to rotation thereof instead of or in addition to the straps 114.

With continued reference to FIGS. 1-6, operation of the strand trimmer 10 is described in accordance with an exemplary embodiment. Operation of the strand trimmer 10 is described with respect to the cutter-spindle assembly 40 and the strand-feed mechanism 68 for simplicity, however it is understood that the cutter-spindle assembly 40' and strand-feed mechanism 68' may also be employed in embodiments. Initially, the strand trimmer 10 is coupled to the boom 4 of the tractor 6 and the tractor 6 positioned alongside the guard rail 8. The strand trimmer 10 is positioned over the guard rail 8 with the trimmer arms 14 extending opposite the direction of travel of the tractor 6. The actuators 46 of the biasing mechanisms 44 for the trimmer arms 14 are actuated to pivot the trimmer arms 14 away from one another. The strand trimmer 10 can then be lowered toward the guard rail 8 to place one trimmer arm 14 on each side of the guard rail 8. The actuators 46 are then actuated to move the trimmer arms 14 toward one another. In this operational position the trimmer arms 14 extend toward one another and at generally acute angles relative to the guard rail 8. In one embodiment, the actuators 46 may be placed in a floating mode or non-pressurized mode and the bias of the telescoping rods 48 allowed to draw the trimmer arms 14 toward one another. Alternatively, the guard rail 8 may be engaged at an end thereof in a manner similar to that described below.

Operation of the cutter-spindle assemblies 40 is initiated. The motors 36 on each trimmer arm 14 are energized, such as by applying a flow of hydraulic fluid therethrough. The motors 36 thus rotate the drive pulleys 54 which in turn rotate the cutter-spindle assemblies 40 via their respective belts 60. As such, all of the components of each cutter-spindle assembly 40 are rotated about an axis extending coaxially through the shaft 58, e.g. the strand canister 66, the spool 76, the plunger 86, the shaft 58, and the strand head 72 are all rotated as a unit. Rotation of the cutter-spindle assemblies 40 functions to move the strands 64 extending from the strand head 72 through a circular stand path at a rotational speed sufficient to cut through vegetation when struck by the ends or along the length of the strands 64.

The strands 64 may deteriorate or portions thereof may be worn away or broken off during operation of the strand trimmer 10. Additional lengths of strand 64 can be fed from the spool 76 in the strand canister 66 by energizing the solenoid 92 of the strand-feed mechanisms 68. Doing so feeds incremental lengths of the strands 64 from the spool 76 and feeds the strands 64 out of the strand head 72. When two strands 64 are employed in the cutter-spindle assembly 40, as depicted in FIGS. 1-6, both strands 64 are fed out simultaneously. Each of the strand-feed mechanisms 68 on the respective trimmer arms 14 may be actuated individually or they may be operated simultaneously. A blade (not shown) may be coupled to the underside of the body 34 to cut excess lengths of strand 64 such that a maximum strand length can be defined.

Orientation of the spool 76 to rotate about a horizontal axis to feed out the strand 64 reduces or eliminates any effects of centrifugal forces on the spool 76 produced by rotation of the cutter-spindle assembly 40. As such, binding, jamming, or otherwise unwanted effects on the strands 64 that are seen in known trimming devices and caused by centrifugal forces acting on the strand reservoirs are reduced or eliminated. In another embodiment the spool 76 may be oriented with the strand 64 coiled around a vertical axis. In this configuration, the strand 64 can be fed from an interior of the coil, e.g. nearest the vertical axis, to reduce or eliminate negative effects of centrifugal forces encountered by the strand 64 during rotation of the cutter-spindle assembly 40.

Upon exhaustion of the strand 64 on the spool 76, the spool 76 can be easily replaced. The housing 74 of the strand canister 66 includes a lid 100 that is removed to expose the empty spool 76. The empty spool 76 can be lifted and removed from the housing 74. The spacers 78 in the strand canister 66 may include a vertically extending slot 102 that accepts a respective end of an axle 104 in the spool 76 to support the spool 76 and to allow its removal from the housing 74.

Ends of strands 64 on the fresh spool 76 are fed through the opening 83 in the bottom wall of the strand canister 66, through the strand-passages 88 in the shaft 58, and through the interior passages 90 in the strand head 72. The fresh spool 76 is inserted into the housing 74 and the lid 100 replaced. In another embodiment, the spool 76 and the spacers 78 may be joined to form a cartridge that can be removed from the housing 74 in its entirety and replaced with a fresh cartridge or the strand canister 66 and all of its contents might be replaceable in its entirety. When employed in embodiments, the straps 114 may be decoupled or removed to enable removal of the spent spool 76 or 76' and then recoupled to the flange 116 or other feature after the fresh spool 76 or 76' is installed.

The strand trimmer 10 is moved along the length of the guard rail 8 with the trimmer arms 14 following behind the frame 12. The distal ends of the trimmer arms 14 are offset relative to the direction of travel to allow their respective stand paths to at least partially overlap when no obstacle is positioned therebetween. The roller guide 30 on at least one of the legs 18 is maintained in contact with the guard rail 8 to maintain the strand trimmer 10 generally centered relative to the guard rail 8. Movement of the cross-member 16 of the frame 12 within the mounting sleeve 20 further aids to maintain the strand trimmer 10 in the desired alignment with the guard rail 8 as the tractor 6 drives along on what may be uneven ground.

As the strand trimmer 10 is moved along the guard rail 8 obstacles such as a post 2 may be encountered and pass between the trimmer arms 14. The follower wheels 38 of the trimmer arms 14 contact the post 2 and roll therealong. Contact of the follower wheels 38 with the post 2 operates against the biasing mechanism 44 to pivot the respective trimmer arm 14 outwardly away from the post 2. The follower wheel 38 rolls along and follows the contour of the post 2 or other obstacle keeping the strand path in a desired proximity to the post 2, e.g. the strand path can be maintained such that the strands 64 contact the post 2 or are prevented from contacting the post 2. The biasing mechanism 44 maintains the follower wheel 38 in contact with the post 2 and upon clearing the post 2, the biasing mechanism 44 returns the trimmer arm 14 to its original position.

Figure 7:
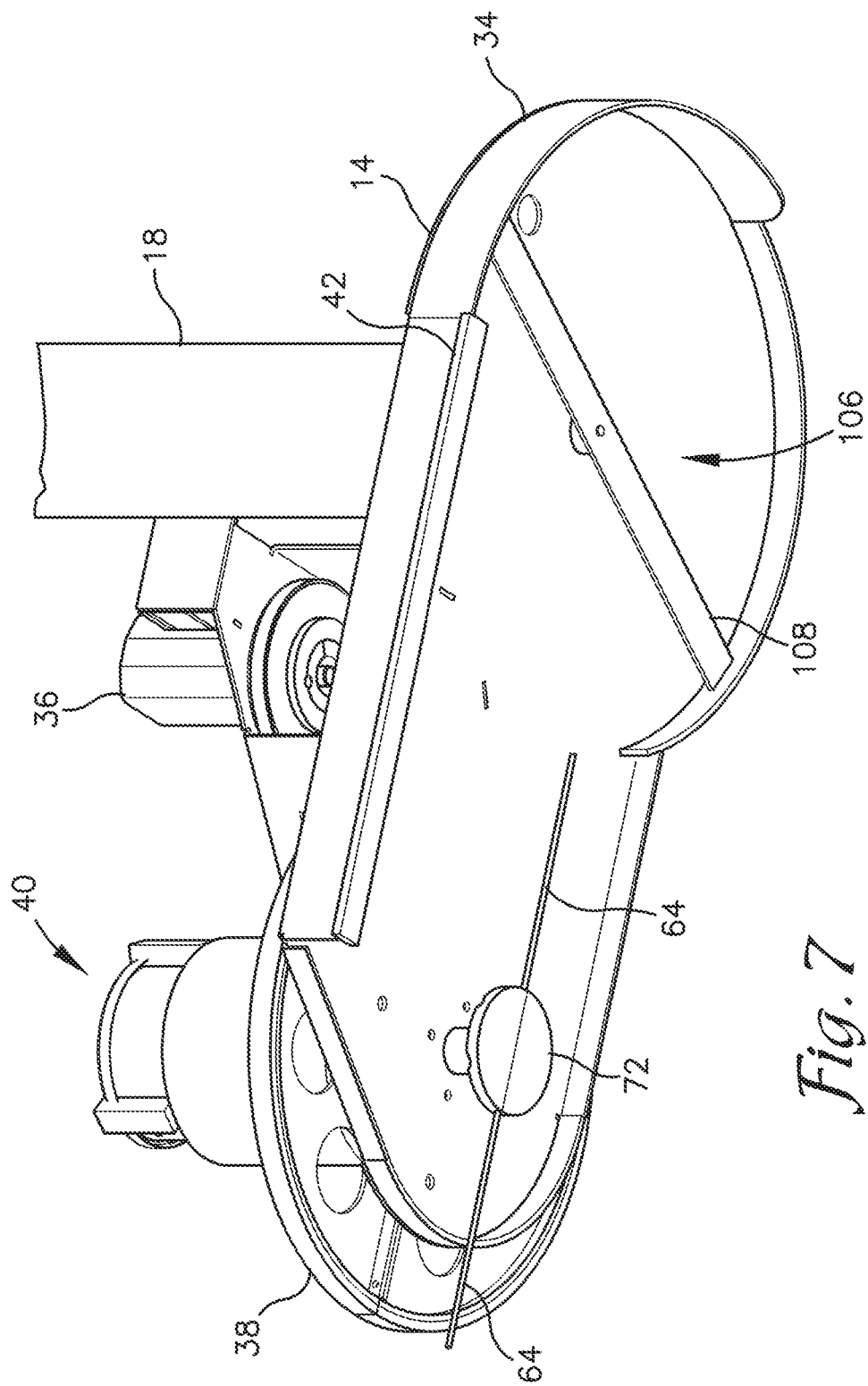
FIG. 7 is a bottom perspective view of a strand trimmer that includes a blade mower on each trimmer arm depicted in accordance with another exemplary embodiment.

With additional reference now to FIG. 7, in another embodiment the strand trimmer 10 may include secondary trimming elements 106 disposed along the length of each of the trimmer arms 14 between the pivotal coupling with the legs 18 and the cutter-spindle assembly 40. The secondary trimming elements 106 can comprise mowing blades 108 as depicted in FIG. 7, or the secondary trimming elements 106 might comprise strand trimmer units configured similarly to the cutter-spindle assembly 40 among other configurations. The secondary trimming elements 106 can be mechanically, hydraulically, electrically, pneumatically, or otherwise powered and can be powered via the same or different power circuit than that used to operate the motor 36. The secondary trimming elements 106 may increase the width of a trimming or mowing path that is provided by the strand trimmer 10 along each side of the guard rail 8. The secondary trimming elements 106 may also enable more diverse application of the strand trimmer 10 in applications in open areas in which known mowing devices might otherwise be employed, e.g. not around obstacles such as guard rails 8.

Referring now to FIGS. 11-14, a cutter-spindle assembly 40" is described in accordance with another exemplary embodiment. The cutter-spindle assembly 40" shares several components with the cutter-spindle assemblies 40 and 40' discussed above; such components may be similar in configuration and/or function unless indicated otherwise and are not described in detail again here. Those components are provided with matching reference numerals but with a double-prime indicator (").

The cutter-spindle assembly 40" is mounted on a trimmer arm, such as the trimmer arm 14, via a spindle collar 62" disposed on a trimmer arm. The spindle collar 62" includes a pair of bearing assemblies 70" and a solenoid 92" disposed therein and aligned along an axial bore. A shaft 58" is disposed in the axial bore and is enabled for rotational motion about the axis of the bore via the bearing assemblies 70". The solenoid 92" at least partially encircles the shaft 58" and remains static relative to the spindle collar 62" while the shaft 58" rotates therein. In some embodiments, the shaft 58" may be held in place axially by a snap ring 65 disposed in a corresponding groove on an outer surface of the shaft 58"; the snap ring 65 also being abuttingly engaged with the upper bearing assembly 70". Similarly, the solenoid 92" may be held in place axially by a pair of snap rings 75 and 85 disposed in corresponding grooves on an inner surface of the spindle collar 62". The lower bearing assembly 70" may rest on a shoulder of a lower portion of the shaft 58" which may serve to keep the lower bearing assembly 70" in place axially.

The shaft 58" extends at least partially from a bottom end of the spindle collar 62" where it couples (via a plurality of screws 95, for example) to an upper assembly 120 of a strand canister 66". In some embodiments, the upper assembly 120 may be integral with the shaft 58". The upper assembly 120 includes a radially outwardly extending plate 122 that provides an axially extending wall 123 on which a spindle-pulley 56" is mounted. The upper assembly 120 provides a downwardly extending cylindrical housing 124 with a radially extending coupling flange 126 on an exterior thereof and an upper feed ring 128 and a lower feed ring 130 interior thereto. The coupling flange 126 may include a plurality of tapped holes or nuts 105 configured to receive a respective plurality of bolts 115 to fasten the lower portion of strand canister 66" to the upper assembly 120. The upper and lower feed rings 128, 130 each include a plurality of radially inwardly extending tabs 132 spaced about their interior edges. The tabs 132 of the upper feed ring 128 are offset from those of the lower feed ring 130 by, for example, about 15° in some embodiments, however other arrangements may be employed.

The shaft 58" provides an axially aligned plunger bore 84" that is open at its lower end to extend into the strand canister 66" coupled below the shaft 58". Within the plunger bore 84" of the shaft 58" is disposed a plunger 86", an actuator ring 134, an intermediate ring 136, and a guide ring 138. The actuator ring 134 comprises a thick-walled, hollow cylinder comprised of a magnetic material such as iron, steel, or similar metal alloy. The actuator ring 134 is fixedly coupled to or around a top end of the plunger 86" and has an exterior diameter configured to fit within the plunger bore 84" in close proximity to the wall thereof and to be axially moveable therein. The plunger 86" may be comprised of a non-magnetic material, such as brass, bronze, aluminum, stainless steel, plastic, or similar material, for example.

The intermediate ring 136 is constructed from a magnetic material such as iron, steel, or similar metal alloy to interact with a magnetic field generated by the solenoid 92" as described further below. The guide ring 138 is constructed of a non-magnetic material such as a brass, bronze, aluminum, stainless steel, plastic, or similar material and guides plunger 86" axially within the bore 84". Both of the rings 136 and 138 are configured with an axial bore that is dimensioned to allow the plunger 86" to freely move axially therethrough. The rings 136, 138 may have external dimensions that may provide a friction-fit or press-fit within the plunger bore 84" to secure the rings 136, 138 in fixed positions with respect to the shaft 58". In some embodiments, the plunger 86" and ring 134 may rotate about the central axis when shaft 58" is rotated (although the rotation of plunger 86" and ring 134 may or may not be the same as that of shaft 58"), and in other embodiments the plunger 86" and ring 134 may not rotate about the central axis when shaft 58" is rotated.

The strand canister 66" is fixedly coupled beneath the shaft 58" via the upper assembly 120 and includes a strand-spool 76" disposed therein. The strand canister 66" includes an annular sidewall 140 and a base plate 142 that mate with the upper assembly 120 to form a hollow, cylindrical housing in which the strand-spool 76" is disposed.

A pair of wings 144 extend from diametrically opposite sides of the annular sidewall 140. Each of the wings 144 includes a passageway 145 extending therethrough from the interior of the strand-cannister 66" to a distal end of the wing 144 through which the strand 64 can pass. The wings 144 may include an upwardly angled deflection panel 146 configured to create turbulence in the grass to be cut and thereby improve cutting and/or deflect the wings 144 over obstacles that may be struck during operation of the strand trimmer 10. The deflection panels 146 and/or other portions of the wings 144 may also be configured to aid trimming of vegetation such as by providing additional cutting surfaces and/or by inducing airflow in a direction that aids cutting. For example, an induced upward airflow may aid to stand vegetation up vertically to aid cutting, or an induced airflow may aid to blow cut vegetation away from a cutting zone so as not to impede further cutting.

The strand canister 66" includes a stub-axle 148 extending from the base plate 142 into the interior of the strand canister 66" and positioned coaxially with the strand-spool 76" and the plunger 86". The stub-axle 148 is configured to engage a hub 150 of the spool 76" and to allow rotation of the spool 76" relative to the strand canister 66". A coil spring 152 is disposed on the stub-axle 148 and between the base plate 142 and the spool 76" to bias the spool 76" upwardly away from the base plate 142.

The strand-spool 76" is oriented to rotate about a generally vertical axis that is aligned with the rotational axis of the shaft 58" and the plunger 86" and is configured to be contacted by a distal or bottom end of the plunger 86" when the strand-feed mechanism 68" is actuated, as described more fully below. The spool 76" includes a spline 80" that divides the spool 76" into two sections which each receive a length of the strand 64. The spool 76" may further include a circumferential fin 154 at each axial end thereof to retain the strand 64 along the axial length of the spool 76". A sequencing gear 156 is coupled to a top axial end of the spool 76" and/or to the respective circumferential fin 154. The sequencing gear 156 provides a plurality of radially extending teeth 158 spaced apart about the circumference of the top end of the spool 76". The teeth 158 are configured to selectively engage the tabs 132 of the upper and lower feed rings 128, 130 as described more fully below.

With continued reference to FIGS. 11-14, operation of the strand-feed mechanism 68" and the cutter-spindle assembly 40" is described in accordance with an exemplary embodiment. Like the cutter-spindle assemblies 40 and 40', the cutter-spindle assembly 40" includes a spindle-pulley 56 that is engaged by a belt 60 or similar means to operably engage the cutter-spindle assembly 40" with a motor 36 or other drive means. Thereby, the shaft 58" is rotated within the spindle collar 62" while the solenoid 92" remains fixed relative to the spindle collar 62". Rotation of the shaft 58" also rotates the strand canister 66" and all components coupled to the shaft 58" and the strand canister 66".

Rotation of the shaft 58" and associated components is preferably high-speed rotation, such as greater than about 3,000 rpm (revolutions per minute), or greater than about 3,500 rpm, or preferably about 4,000 rpm, for example. Such rotational speeds provide substantial cutting power and speed to allow cutting of thick vegetation at appreciable rates. In some embodiments, high strength/durability strands 64 may be employed. For example, the strand 64 may comprise 0.150-inch diameter nylon or other suitable material. Of course, other rotational speeds and strand materials and gauges may be used.

In a normal or non-energized state, the strand-spool 76" is biased toward and/or against the plate 122 of the upper assembly 120, and the sequencing gear 156 is vertically or axially aligned with the upper feed ring 128. Rotation of the strand canister 66" applies a centrifugal force on the strands 64 extending therefrom which in turn applies a rotational force on the spool 76" and moves or rotates the teeth 158 of the sequencing gear 156 into contact with the tabs 132 of the upper feed ring 128. Engagement of the teeth 158 with the tabs 132 of the upper feed ring 128 resists rotation of the spool 76" and thus restricts feeding out of the strands 64.

When feeding out of additional lengths of the strands 64 is desired, the strand-feed mechanism 68" is actuated, such as by an operator depressing a button, switch, or the like or automatically by a control system (not shown) employing one or more sensors (not shown) to detect the length of the strands 64. For example, sensors may detect the length of the strands 64 or an amount of centrifugal force applied by the strands 64 to determine when additional length of strand 64 should be fed out. Actuation of the strand-feed mechanism 68" via an electrical wire 93, for example, energizes the solenoid 92" to create a magnetic field that magnetizes the intermediate ring 136, which in turn attracts the actuator ring 134 on the plunger 86" and non-contactingly draws the plunger 86" axially downward within the plunger bore 84" of the shaft 58". A distal or lower end of the plunger 86" thus contacts and pushes the spool 76" axially downward toward the base plate 142 of the strand canister 66" a distance substantially equal to or just greater than the thickness of the upper feed ring 128.

Upon moving downwardly beyond the upper feed ring 128, the teeth 158 of the sequencing gear 156 are disengaged with the tabs 132 of the upper feed ring 128 and the spool 76" is free to rotate relative to the strand canister 66". Centrifugal forces on the strands 64 cause rotation of the spool 76" which brings the teeth 158 into contact with the tabs 132 of the lower feed ring 130 and obstructs further rotation of the spool 76". In some embodiments, the spool 76" rotates about 15° and feeds out about 0.5 inches of strand 64, however the rotation and feed lengths can be modified as desired.

Upon de-energizing of the solenoid 92", the coil spring 152 biases the spool 76" to return axially upward and to move the plunger 86" upward into the shaft 58". Once the spool 76" is moved sufficiently upward to disengage the teeth 158 from the tabs 132 of the lower feed ring 130, the spool 76" is again allowed to rotate until the teeth 158 again rotate into contact with the tabs 132 of the upper feed ring 128. In some embodiments, this rotation is about 15° and feeds out about 0.5 inches of strand 64, however other configurations are possible. The spool 76" is maintained in the upwardly biased position by the coil spring 152 until the solenoid 92" is again energized. The energizing and de-energizing cycle may be repeated as often as needed to feed out desired lengths of strand 64. Thus, the spool 76" may be selectively or automatically actuated via solenoid 92" to feed out predetermined, discrete lengths of strand 64 from canister 66" as the distal ends of strand 64 are consumed during cutting operations. When the strand 64 is completely consumed, the spool 76" may be removed and reloaded with a new strand 64 and replaced, or a replacement spool 76" with new strand 64 pre-wound thereon may be inserted into canister 66".

There now follows a description of alternative embodiments set out as clauses:

Clause 1: A strand trimmer comprising: a spindle collar mountable to a trimmer arm; a cutter-spindle assembly rotatably mounted to the spindle collar to be rotatable about an axis, the cutter-spindle assembly including a shaft aligned coaxially with the axis, the shaft including a bore aligned coaxially with the axis and extending along at least a portion of the length of the shaft, a plunger disposed within the bore in the shaft and being moveable axially within the bore, a strand canister coupled to the shaft, an interior of the strand canister being in communication with the bore in the shaft, and a spool disposed in the strand canister and including a length of a strand wound thereon, the spool being rotatable relative to the strand-canister about a spool-axis that is aligned with the axis of the cutter-spindle assembly; and a solenoid disposed on the spindle collar in proximity to the plunger and operable to non-contactingly move the plunger axially within the bore, the plunger thereby moving the spool axially within the strand canister to feed out the strand from the spool, the shaft being rotated within the solenoid while the solenoid and the spindle collar remain non-rotatably fixed.

Clause 2: The strand trimmer of clause 1, wherein the solenoid is operable to move the plunger axially within the bore in a first direction, and further comprising: a return spring disposed in the strand canister and configured to move the plunger axially in a second direction that is opposite the first direction when the solenoid is not energized.

Clause 3: The strand trimmer of clause 2, further comprising: a first feed ring disposed in the strand canister and including a plurality of first tabs extending radially inward toward the axis; a second feed ring disposed in the strand canister adjacent the first feed ring and including a plurality of second tabs extending radially inward toward the axis, the second tabs being rotationally offset from the first tabs; and a sequencing gear disposed on the spool that includes a plurality of radially outwardly extending teeth, the first tabs obstructing rotational motion of the teeth in a first axial position when the solenoid is not energized, and the second tabs obstructing rotational motion of the teeth in a second axial position when the solenoid is energized.

Clause 4: The strand trimmer of clause 3, wherein upon the solenoid being energized, the plunger and the spool are moved axially in the first direction, and the teeth of the sequencing gear are moved out of engagement with the first tabs, and wherein the spool is enabled to rotate about the spool-axis to feed out a first length of the strand.

Clause 5: The strand trimmer of clause 4, wherein the spool is enabled to rotate about the spool-axis a first rotational amount that is defined by a rotational spacing between the first tabs and the second tabs.

Clause 6: The strand trimmer of clause 5, wherein upon the solenoid being de-energized, the plunger and the spool are moved axially in the second direction, the teeth are moved out of engagement with the second tabs, and the spool is enabled to rotate a second rotational amount about the spool-axis to feed out a second length of the strand, the second rotational amount being defined by said spacing.

Clause 7: The strand trimmer of clause 3, wherein the first feed ring lies in a first radial plane and the second feed ring lies in a second radial plane that is parallel and adjacent to the first radial plane, the first and second radial planes being aligned perpendicular to the axis, and the sequencing gear being axially moveable between alignment with the first and second radial planes.

Clause 8: The strand trimmer of clause 1, wherein the spindle collar is mounted to a trimmer arm, and wherein the trimmer arm is carried by a vehicle, and a motor mounted on the trimmer arm is operably coupled to the shaft and rotates the shaft about the axis, the shaft being rotated within the spindle collar, and the rotation imparting a centrifugal force on a distal end of the strand extending from the strand canister, the centrifugal force imparting a tension force on the strand which urges the spool into rotation about the axis.

Clause 9: The strand trimmer of clause 1, further comprising: a pair of wings extending radially outward from the strand canister in diametrically opposing directions, each of the wings including a passageway, the strand extending from the spool through the passageway and beyond a distal end of the respective wing.

Clause 10: The strand trimmer of clause 9, wherein each of the wings includes an upwardly angled deflection panel.

Clause 11: A method for operating a strand-feed mechanism in a strand trimmer, the method comprising: rotating a cutter-spindle assembly mounted on a trimmer arm, the cutter-spindle assembly including a shaft having an axial bore in which a plunger is disposed and a strand canister coupled to an end of the shaft; energizing a solenoid that is affixed to the trimmer arm and in close proximity to the cutter-spindle assembly; non-contactingly moving the plunger via a magnetic field produced by the solenoid, the plunger moving in a first direction axially along the bore and along a rotational axis of the cutter-spindle assembly; enabling a strand-spool disposed in the strand canister to perform a first rotation by movement of the strand-spool axially along the axis by the plunger; and performing the first rotation by rotating the strand-spool a first rotational amount about the axis and relative to the strand canister to feed out a first length of a strand from the strand canister.

Clause 12: The method of clause 11, further comprising: de-energizing the solenoid; and moving the plunger and the strand-spool axially in a second direction that is opposite the first direction.

Clause 13: The method of clause 12, wherein said moving the plunger and the strand-spool axially in the second direction further comprises: enabling the strand-spool to perform a second rotation; performing the second rotation by rotating the strand-spool a second rotational amount about the axis and relative to the strand canister; and feeding out a second length of the strand.

Clause 14: The method of clause 13, wherein the cutter-spindle assembly includes a first feed ring disposed in the strand canister and including a plurality of first tabs extending radially inward toward the axis, a second feed ring disposed in the strand canister adjacent the first feed ring and including a plurality of second tabs extending radially inward toward the axis, the second tabs being rotationally offset from the first tabs, and the strand-spool includes a sequencing gear that includes a plurality of radially outwardly extending teeth, interaction between the first tabs and the teeth obstructing the first rotation when the solenoid is not energized, and interaction between the second tabs and the teeth obstructing the second rotation when the solenoid is energized.

Clause 15: A strand trimmer comprising: a trimmer arm including a spindle collar; a cutter-spindle assembly rotatably mounted to the spindle collar to be rotatable about an axis, the cutter-spindle assembly including a shaft aligned coaxially with the axis, the shaft including a bore aligned coaxially with the axis and extending along at least a portion of the length of the shaft; a plunger disposed within the bore in the shaft and being moveable axially within the bore; a strand canister coupled to the shaft, an interior of the strand canister being in communication with the bore in the shaft; a first feed ring disposed in the strand canister and including a plurality of first tabs extending radially inward toward the axis; a second feed ring disposed in the strand canister adjacent the first feed ring and including a plurality of second tabs extending radially inward toward the axis, the second tabs being rotationally offset from the first tabs; a spool disposed in the strand canister and including a length of a strand wound thereon; a solenoid disposed on the spindle collar in proximity to the plunger and operable to non-contactingly move the plunger axially in a first direction within the bore to feed out the strand from the spool when the solenoid is energized, the shaft being rotated within the solenoid while the solenoid and the spindle collar remain non-rotatably fixed to the trimmer arm; a sequencing gear disposed on the spool that includes a plurality of radially outwardly extending teeth, the first tabs obstructing rotational motion of the teeth when the solenoid is not energized, and the second tabs obstructing rotational motion of the teeth when the solenoid is energized; and a return spring disposed in the strand canister and configured to move the plunger axially in a second direction that is opposite the first direction when the solenoid is not energized.

Clause 16: The strand trimmer of clause 15, wherein when the solenoid is energized, the plunger and the spool are moved axially, and the teeth of the sequencing gear are moved out of engagement with the first tabs, and wherein the spool is enabled to rotate about the axis to feed out a first length of the strand.

Clause 17: The strand trimmer of clause 16, wherein the spool is enabled to rotate about the axis a first rotational amount that is defined by a spacing between the first tabs and the second tabs.

Clause 18: The strand trimmer of clause 17, wherein when the solenoid is de-energized, the plunger and the spool are moved axially in the second direction, the teeth are moved out of engagement with the second tabs, and the spool is enabled to rotate a second rotational amount about the axis to feed out a second length of the strand, the second rotational amount being defined by said spacing.

Clause 19: The strand trimmer of clause 15, wherein the first feed ring lies in a first radial plane and the second feed ring lies in a second radial plane that is parallel and adjacent to the first radial plane, the first and second radial planes being aligned perpendicular to the axis, and the sequencing gear being axially moveable between alignment with the first and second radial planes.

Clause 20: The strand trimmer of clause 15, wherein the trimmer arm is carried by a vehicle, and a motor mounted on the trimmer arm is operably coupled to the shaft and rotates the shaft about the axis, the shaft being rotated within the spindle collar, and the rotation imparting a centrifugal force on a distal end of the strand extending from the strand canister, the centrifugal force imparting a tension force on the strand which urges the spool into rotation about the axis.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A strand trimmer comprising:
a spindle collar mountable to a trimmer arm;
a cutter-spindle assembly rotatably mounted to the spindle collar to be rotatable about an axis, the cutter-spindle assembly including
a shaft aligned coaxially with the axis, the shaft including a bore aligned coaxially with the axis and extending along at least a portion of the length of the shaft,
a plunger disposed within the bore in the shaft and being moveable axially within the bore,
a strand canister coupled to the shaft, an interior of the strand canister being in communication with the bore in the shaft, and
a spool disposed in the strand canister and including a length of a strand wound thereon; and
a solenoid disposed on the spindle collar in proximity to the plunger and operable to non-contactingly move the plunger axially within the bore to feed out the strand from the spool, the shaft being rotated within the solenoid while the solenoid and the spindle collar remain non-rotatably fixed.

2. The strand trimmer of claim 1, wherein the solenoid is operable to move the plunger axially within the bore in a first direction, and further comprising:
a return spring disposed in the strand canister and configured to move the plunger axially in a second direction that is opposite the first direction when the solenoid is not energized.

3. The strand trimmer of claim 2, further comprising:
a first feed ring disposed in the strand canister and including a plurality of first tabs extending radially inward toward the axis;
a second feed ring disposed in the strand canister adjacent the first feed ring and including a plurality of second tabs extending radially inward toward the axis, the second tabs being rotationally offset from the first tabs; and
a sequencing gear disposed on the spool that includes a plurality of radially outwardly extending teeth, the first tabs obstructing rotational motion of the teeth in a first axial position wherein the solenoid is not energized, and the second tabs obstructing rotational motion of the teeth in a second axial position wherein the solenoid is energized.

4. The strand trimmer of claim 3, wherein upon the solenoid being energized, the plunger and the spool are moved axially in the first direction, and the teeth of the sequencing gear are moved out of engagement with the first tabs, and wherein the spool is enabled to rotate about the axis to feed out a first length of the strand.

5. The strand trimmer of claim 4, wherein the spool is enabled to rotate about the axis a first rotational amount that is defined by a rotational spacing between the first tabs and the second tabs.

6. The strand trimmer of claim 5, wherein upon the solenoid being de-energized, the plunger and the spool are moved axially in the second direction, the teeth are moved out of engagement with the second tabs, and the spool is enabled to rotate a second rotational amount about the axis to feed out a second length of the strand, the second rotational amount being defined by said spacing.

7. The strand trimmer of claim 3, wherein the first feed ring lies in a first radial plane and the second feed ring lies in a second radial plane that is parallel and adjacent to the first radial plane, the first and second radial planes being aligned perpendicular to the axis, and the sequencing gear being axially moveable between alignment with the first and second radial planes.

8. The strand trimmer of claim 1, wherein the spindle collar is mounted to a trimmer arm, and wherein the trimmer arm is carried by a vehicle, and a motor mounted on the trimmer arm is operably coupled to the shaft and rotates the shaft about the axis, the shaft being rotated within the spindle collar, and the rotation imparting a centrifugal force on a distal end of the strand extending from the strand canister, the centrifugal force imparting a tension force on the strand which urges the spool into rotation about the axis.

9. The strand trimmer of claim 1, further comprising:
a pair of wings extending radially outward from the strand canister in diametrically opposing directions, each of the wings including a passageway, the strand extending from the spool through the passageway and beyond a distal end of the respective wing.

10. The strand trimmer of claim 9, wherein each of the wings includes an upwardly angled deflection panel.

11. A method for operating a strand-feed mechanism in a strand trimmer, the method comprising:
rotating a cutter-spindle assembly mounted on a trimmer arm, the cutter-spindle assembly including a shaft having an axial bore in which a plunger is disposed and a strand canister coupled to an end of the shaft;
energizing a solenoid that is affixed to the trimmer arm and in close proximity to the cutter-spindle assembly;
non-contactingly moving the plunger via a magnetic field produced by the solenoid, the plunger moving in a first direction axially along the bore;
enabling a strand-spool disposed in the strand canister to perform a first rotation by movement of the strand-spool axially along the axis by the plunger; and
performing the first rotation by rotating the strand-spool a first rotational amount relative to the strand canister to feed out a first length of a strand from the strand canister.

12. The method of claim 11, further comprising:
de-energizing the solenoid; and
moving the plunger and the strand-spool axially in a second direction that is opposite the first direction.

13. The method of claim 12, wherein said moving the plunger and the strand-spool axially in the second direction further comprises:
enabling the strand-spool to perform a second rotation;
performing the second rotation by rotating the strand-spool a second rotational amount relative to the strand canister; and
feeding out a second length of the strand.

14. The method of claim 13, wherein the cutter-spindle assembly includes a first feed ring disposed in the strand canister and including a plurality of first tabs extending radially inward toward the axis, a second feed ring disposed in the strand canister adjacent the first feed ring and including a plurality of second tabs extending radially inward toward the axis, the second tabs being rotationally offset from the first tabs, and the strand-spool includes a sequencing gear that includes a plurality of radially outwardly extending teeth, interaction between the first tabs and the teeth obstructing the first rotation when the solenoid is not energized, and interaction between the second tabs and the teeth obstructing the second rotation when the solenoid is energized.

15. A strand trimmer comprising:
a trimmer arm including a spindle collar;
a cutter-spindle assembly rotatably mounted to the spindle collar to be rotatable about an axis, the cutter-spindle assembly including a shaft aligned coaxially with the axis, the shaft including a bore aligned coaxially with the axis and extending along at least a portion of the length of the shaft;
a plunger disposed within the bore in the shaft and being moveable axially within the bore;
a strand canister coupled to the shaft, an interior of the strand canister being in communication with the bore in the shaft;
a first feed ring disposed in the strand canister and including a plurality of first tabs extending radially inward toward the axis;
a second feed ring disposed in the strand canister adjacent the first feed ring and including a plurality of second tabs extending radially inward toward the axis, the second tabs being rotationally offset from the first tabs;
a spool disposed in the strand canister and including a length of a strand wound thereon;
a solenoid disposed on the spindle collar in proximity to the plunger and operable to non-contactingly move the plunger axially in a first direction within the bore to feed out the strand from the spool when the solenoid is energized, the shaft being rotated within the solenoid while the solenoid and the spindle collar remain non-rotatably fixed to the trimmer arm;
a sequencing gear disposed on the spool that includes a plurality of radially outwardly extending teeth, the first tabs obstructing rotational motion of the teeth when the solenoid is not energized, and the second tabs obstructing rotational motion of the teeth when the solenoid is energized; and
a return spring disposed in the strand canister and configured to move the plunger axially in a second direction that is opposite the first direction when the solenoid is not energized.

16. The strand trimmer of claim 15, wherein when the solenoid is energized, the plunger and the spool are moved axially, and the teeth of the sequencing gear are moved out of engagement with the first tabs, and wherein the spool is enabled to rotate about the axis to feed out a first length of the strand.

17. The strand trimmer of claim 16, wherein the spool is enabled to rotate about the axis a first rotational amount that is defined by a spacing between the first tabs and the second tabs.

18. The strand trimmer of claim 17, wherein when the solenoid is de-energized, the plunger and the spool are moved axially in the second direction, the teeth are moved out of engagement with the second tabs, and the spool is enabled to rotate a second rotational amount about the axis to feed out a second length of the strand, the second rotational amount being defined by said spacing.

19. The strand trimmer of claim 15, wherein the first feed ring lies in a first radial plane and the second feed ring lies in a second radial plane that is parallel and adjacent to the first radial plane, the first and second radial planes being aligned perpendicular to the axis, and the sequencing gear being axially moveable between alignment with the first and second radial planes.

20. The strand trimmer of claim 15, wherein the trimmer arm is carried by a vehicle, and a motor mounted on the trimmer arm is operably coupled to the shaft and rotates the shaft about the axis, the shaft being rotated within the spindle collar, and the rotation imparting a centrifugal force on a distal end of the strand extending from the strand canister, the centrifugal force imparting a tension force on the strand which urges the spool into rotation about the axis.

* * * * *